United States Patent
Yamada et al.

(10) Patent No.: US 10,225,750 B2
(45) Date of Patent: Mar. 5, 2019

(54) TRANSMISSION MODULE, INFORMATION TRANSMISSION NETWORK SYSTEM, INFORMATION TRANSMISSION METHOD, INFORMATION TRANSMISSION PROGRAM

(71) Applicant: OMRON Corporation, Kyoto-shi, Kyoto (JP)

(72) Inventors: Ryota Yamada, Kyotanabe (JP); Yusuke Yamaji, Ikoma (JP); Yuki Inoue, Sakai (JP); Hajime Umeki, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 156 days.

(21) Appl. No.: 15/121,992

(22) PCT Filed: Mar. 14, 2014

(86) PCT No.: PCT/JP2014/057002
§ 371 (c)(1),
(2) Date: Aug. 26, 2016

(87) PCT Pub. No.: WO2015/136713
PCT Pub. Date: Sep. 17, 2015

(65) Prior Publication Data
US 2017/0070899 A1    Mar. 9, 2017

(51) Int. Cl.
*H04W 24/04* (2009.01)
*H04W 48/16* (2009.01)
*H04W 52/02* (2009.01)

(52) U.S. Cl.
CPC ............ *H04W 24/04* (2013.01); *H04W 48/16* (2013.01); *H04W 52/02* (2013.01); *Y02D 70/00* (2018.01); *Y02D 70/22* (2018.01)

(58) Field of Classification Search
CPC ...... H04W 24/04; H04W 52/02; H04W 48/16
See application file for complete search history.

(56) References Cited

U.S. PATENT DOCUMENTS 7,636,038 B1    12/2009   Nof et al.
2009/0199040 A1   8/2009   Liu et al.
(Continued)

FOREIGN PATENT DOCUMENTS

JP    2012-147090 A    8/2012

OTHER PUBLICATIONS

Extended European search report dated Jul. 21, 2017 in a counterpart European patent application.

*Primary Examiner* — Jamal Javaid
(74) *Attorney, Agent, or Firm* — Metrolexis Law Group, PLLC

(57) ABSTRACT

A module transmits send information to be processed by an information processing apparatus along a transmission path on which the information processing apparatus is present. When the send information is sent in accordance with predetermined sending parameters, if a sending failure in which a sending completion state of the send information cannot be confirmed occurs, a part or all of the sending parameters used for sending of the send information with respect to which the sending failure has occurred are changed, and the send information is resent in accordance with the sending parameters after the changing. Then, the predetermined sending parameter changed between the occurrence of the sending failure and confirmation of the sending completion state of the resent send information, and resend result information related to a send result corresponding to the changed predetermined sending parameter are acquired and sent toward a predetermined processing apparatus.

11 Claims, 14 Drawing Sheets

(56) References Cited

U.S. PATENT DOCUMENTS

| | | | |
|---|---|---|---|
| 2010/0271938 A1* | 10/2010 | Mutoh | H04L 12/4604 |
| | | | 370/228 |
| 2011/0069606 A1* | 3/2011 | Park | H04L 1/1607 |
| | | | 370/216 |
| 2013/0021945 A1* | 1/2013 | Yura | H04L 45/22 |
| | | | 370/254 |

* cited by examiner

| Start Symbol 4 Byte | Length of Destination Address 1 Byte | Destination Address 0 ~ 255 Byte | Length of Source Address 1 Byte | Source Address 0 ~ 255 Byte | Length of Data 2 Byte | Data 0~65535 Byte | Terminator Symbol for Data 4 Byte |
|---|---|---|---|---|---|---|---|
| a1 | a2 | | a3 | | | a4 | a5 |

(b)

| | Type of data | Time of acquisition of data | Data value |
|---|---|---|---|
| Data 1 | Temperature data | 110 | T1 |
| Data 2 | Temperature data | 120 | T2 |

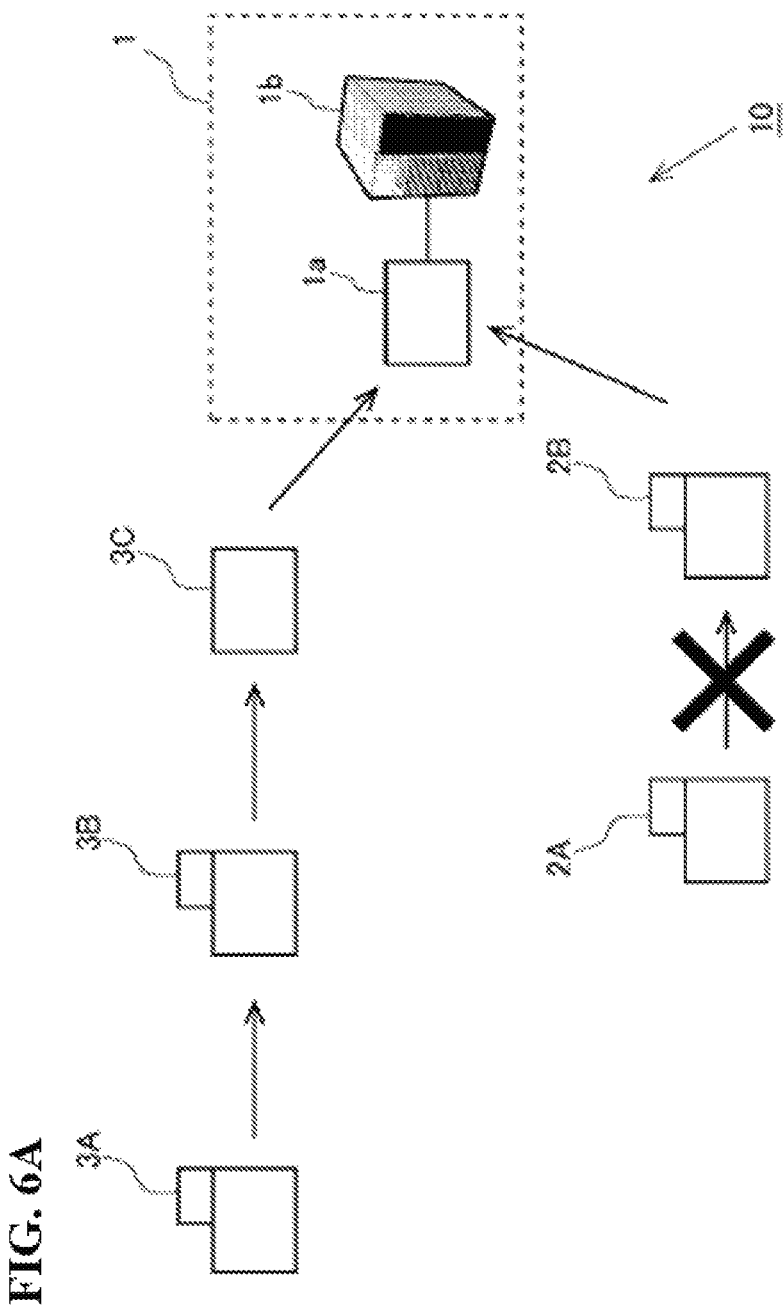

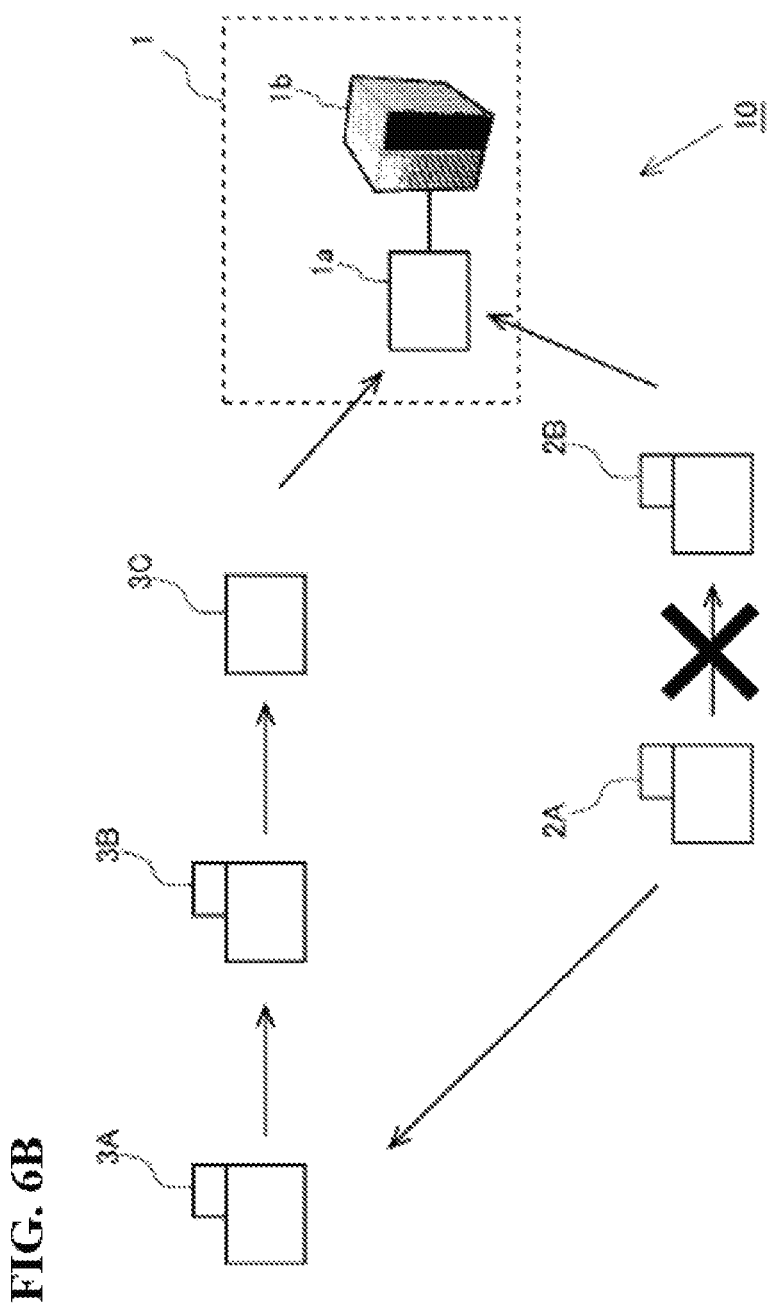

TRANSMISSION MODULE, INFORMATION TRANSMISSION NETWORK SYSTEM, INFORMATION TRANSMISSION METHOD, INFORMATION TRANSMISSION PROGRAM

TECHNICAL FIELD

The present invention relates to a transmission module that transmits information related to an information processing apparatus along a predetermined transmission path on which the information processing apparatus is present, and a network system including the transmission module and the information processing apparatus.

RELATED ART

Conventionally, a technique has been developed that uses sensor modules for measuring environment parameters, such as temperature and humidity, and causes the measured information to be sent to an information processing apparatus via a network. This enables easy collection of a large amount of measured data. In this case, the sensor modules are provided with a wireless function, thereby forming the wireless network for transmission of measured information. With regard to the wireless network, for example, Patent Document 1 discloses a technique in which, when a communication problem has occurred in an ad-hoc wireless network, abuse station receives a communication parameter change request from a wireless terminal, and this base station collects pieces of communication path information associated with the network, thereby sending a communication parameter for constructing a new communication path to each terminal. When the base station grasps the entire network as described above, communication parameter setting is performed without affecting the entire network.

RELATED ART DOCUMENTS

Patent Documents

Patent Document 1: JP 2012-147090A.

SUMMARY OF THE INVENTION

Problem to be Solved by the Invention

In a network inn which information to be transmitted is transmitted to a destination via a plurality of transmission modules, from the standpoint of collecting information, if a communication problem occurs between transmission modules included in the network, information that has been collected until that time via a section in which the problem is occurring does no longer reach the destination, and therefore quick recovery from the communication problem is required. Meanwhile, if, as in the conventional technique, the base station that manages the network issues a request for recovery to the terminals and attempts to perform recovery based on responses from the terminals, although the base station may be able to grasp the communication state of the entire network and then, for example, reconstruct a suitable communication path, it is often difficult to sufficiently grasp the communication state of the entire network due to the section in which the communication problem is occurring.

On the other hand, an information processing apparatus such as the base station that manages the network is required to grasp the status, cause, and the like of the communication problem occurring in the network and maintain a better communication environment. For this purpose, the information processing apparatus is required not only to eliminate the communication problem but also to appropriately collect information related to the communication problem.

The present invention has been made in view of problems such as those described above, and it is an object thereof to provide a transmission module that belongs to a network for information transmission, the transmission module being configured to, when a communication problem has occurred, quickly eliminate the communication problem and collect information regarding the communication problem into a processing apparatus.

Means for Solving the Problems

According to the present invention, in order to address the above-described problems, a configuration is adopted in which when a transmission module that transmits information (hereinafter referred to as "predetermined send information") to be processed by an information processing apparatus along a predetermined transmission path constituting a network has undergone a sending failure in downstream transmission, the transmission module autonomously changes a predetermined sending parameter related to the sending of information. This makes it easy to recover from the failure state without being affected by the sending failure (communication problem) that has occurred on the predetermined transmission path. Moreover, the transmission module sends a process for eliminating the sending failure that the transmission module grasps, that is to say, changes made to the predetermined sending parameter and transitions of the result of sending in accordance with those changes, to a predetermined processing apparatus. Thus, not only the sending failure can be eliminated, but also information regarding the sending failure can be effectively collected into the predetermined processing apparatus. Note that in the present application, "own transmission module" is a term used to specify a certain transmission module included in a network. Specifically, a transmission module is referred to as the "own transmission module" to specify itself on the basis of one reference transmission module that belongs to the network. Moreover, along the flow of information in the network, a transmission module that is located upstream of the own transmission module serving as a reference is referred to as an "upstream transmission module" or the like, and a transmission module that is located downstream of the own transmission module is referred to as a "downstream transmission module" or the like. Accordingly, the terms such as "own transmission module", "upstream transmission module", and "downstream transmission module" are based on relative relationships between transmission modules, and it goes without saying that different transmission modules are specified as the own transmission module for different reference transmission modules. Moreover, a transmission module that need not be distinguished between "own transmission module", "upstream transmission module", "downstream transmission module", and the like may be simply referred to as a "transmission module".

More particularly, an aspect of the present invention is a module that transmits predetermined send information to be processed by an information processing apparatus along a predetermined transmission path on which the information processing apparatus is present. This transmission module includes sending means for sending the predetermined send information from the own transmission module to a downstream transmission module on the predetermined transmission path in accordance with predetermined sending parameters that are set for sending of the predetermined send information from the own transmission module to the downstream transmission module, the downstream transmission module being located downstream of the own transmission module on the predetermined transmission path, confirming means for confirming a sending completion state in which the predetermined send information has been received by the downstream transmission module or has reached the information processing apparatus, resending means for changing, if a sending failure in which the sending completion state of the predetermined send information is not confirmed by the confirming means occurs, a part or all of the predetermined sending parameters used for sending of the predetermined send information with respect to which the sending failure has occurred, and resending the predetermined send information in accordance with the predetermined sending parameters after the changing, and acquiring means for acquiring the predetermined sending parameter changed by the resending means between the occurrence of the sending failure and confirmation of the sending completion state of the predetermined send information resent by the resending means, and resend result information related to a send result corresponding to the changed predetermined sending parameter, wherein the resend result information acquired by the acquiring means is sent toward a predetermined processing apparatus.

In the transmission module according to the present invention, the sending means sends information in accordance with the predetermined sending parameters. That is to say, in the transmission module that belongs to the predetermined transmission path, sending of the predetermined send information from the own transmission module to the downstream transmission module is performed in accordance with the predetermined sending parameters that determine sending conditions. Each transmission module that transmits the predetermined send information has these predetermined sending parameters. On the predetermined transmission path, the transmission modules send the predetermined send information in accordance with their respective predetermined sending parameters, and thus, the predetermined send information is collected from the transmission modules into the information processing apparatus, which is a destination.

Note that the predetermined transmission path is formed by transmission modules that are located at a start point and an end point of the predetermined transmission path, and between the start point and the end point. However, according to the invention of the present application, the predetermined transmission path is not limited to a specific path. That is to say, the predetermined transmission path may be a transmission path that has been determined in advance, or may be a transmission path that may be changed in accordance with a change made to the predetermined sending parameters as described below. Moreover, the predetermined send information transmitted by the transmission module is information to be processed by the information processing apparatus that is present on the predetermined transmission path. According to the present invention, the form of processing of the predetermined send information by the information processing apparatus is not limited to a specific form.

Here, in the transmission module according to the present invention, the confirming means confirms the sending completion state indicating that the predetermined send information sent from the own transmission module to the downstream transmission module by the sending means has reached the downstream transmission module or the information processing apparatus, which is the final destination. For example, the sending completion state with respect to sending to the downstream transmission module can be confirmed using a confirmation signal (acknowledge signal) that the downstream transmission module receiving the predetermined send information sends to the own transmission module. Moreover, the sending completion state with respect to sending to the information processing apparatus can be confirmed using a reception notification that the information processing apparatus receiving the predetermined send information sends to the own transmission module.

Here, if the confirming means of the own transmission module cannot confirm the sending completion state of the predetermined send information, this means that even though the sending means has sent the predetermined send information, the goal of sending the information is not achieved, and therefore it is deemed that a sending failure has occurred for some reason. In this case, in the transmission module according to the present invention, the resending means performs autonomous processing for recovery. That is to say, the resending means changes a part or all of the predetermined sending parameters, which determine the sending conditions for sending from the own transmission module, as processing within the own transmission module, without experiencing an interaction with other transmission modules or an interaction with the information processing apparatus. Accordingly, changing of the predetermined sending parameters is executed without interference from the outside. Then, an attempt to again send the predetermined send information with respect to which the sending failure has occurred is made in accordance with the predetermined sending parameters after the changing.

If the own transmission module confirms the sending failure in this manner, the predetermined sending parameters are autonomously changed within the own transmission module. Thus, the own transmission module returns to its original sending state without being affected by the sending failure that has occurred in communication with the outside at that point in time. Note that after the predetermined send information has been resent by the resending means, and the sending completion state of the resent predetermined send information has been confirmed, sending of the predetermined send information may be performed in accordance with the predetermined sending parameters after the changing, or at a point in time when a certain period of time has elapsed or the cause of the sending failure has been removed, sending of the predetermined send information may be performed in accordance with the predetermined sending parameters prior to the change.

At this time, the own transmission module can grasp the predetermined sending parameters at the time of the occurrence of the sending failure and the predetermined sending parameters after the changing, as well as the result of resending performed in accordance with those predetermined sending parameters. That is to say, since the own transmission module autonomously performs the processing for eliminating the sending failure via the resending means as described above, the own transmission module is in a position to learn of information regarding the sending failure. Thus, with respect to a change made to the predetermined sending parameters between the occurrence of the sending failure and the elimination of the sending failure, resend result information related to a changed predetermined sending parameter and a send result corresponding to that parameter is acquired by the acquiring means as information regarding the sending failure, and this resend result information is sent to the predetermined processing apparatus. Thus, the predetermined processing apparatus can learn of details of the processing for eliminating the sending failure autonomously performed by the own transmission module, and therefore, it is easy for the predetermined processing apparatus to perform analysis processing and the like with respect to the sending failure. Moreover, preferably, the resend result information includes the predetermined sending parameters prior to being changed by the resending means and information regarding a send result corresponding to those parameters. This makes it possible for the predetermined processing apparatus to perform more precise analysis with respect to the sending failure.

Note that it is sufficient if the predetermined processing apparatus is disposed on the predetermined transmission path or connected to the predetermined transmission path so that the predetermined processing apparatus can receive the resend result information from the own transmission module. Moreover, the predetermined processing apparatus may be the information processing apparatus. In this case, collection of the predetermined send information and collection of the resend result information are performed in the same processing apparatus, and thus it is easy to reflect the analysis result and the like of the sending failure based on the resend result information in the collection of predetermined send information. Moreover, in the case where the predetermined processing apparatus and the information processing apparatus are configured separately, it is preferable to electrically connect the two apparatuses to each other so as to enable exchange of information therebetween. In that case as well, it is easy to reflect the analysis result and the like of the sending failure based on the resend result information in the collection of predetermined send information.

Here, in the above-described transmission module, if the sending failure occurs again after the predetermined send information has been resent by the resending means, resending by the resending means involving a further change of the predetermined sending parameters and confirmation of the sending completion state by the confirming means may be repeated. In that case, the acquiring means acquires a plurality of the changed predetermined sending parameters corresponding to the repeatedly changes performed by the resending means, and the resend result information related to a send result corresponding to each of the plurality of predetermined sending parameters. When, as described above, the resend result information includes information regarding changing of the predetermined sending parameters and resending of the predetermined send information that have been repeated in order to eliminate the sending failure, the predetermined processing apparatus can appropriately grasp details about processing for eliminating a sending failure that has occurred in a transmission module, that is, how that transmission module dealt with the sending failure.

Moreover, in the foregoing transmission module, information regarding at least two of the predetermined sending parameters and send results corresponding to the at least two sending parameters, of the resend result information, may be formed as summarized information with a compressed information volume. In the case where the resend result information includes information regarding at least two predetermined sending parameters and send results corresponding to the at least two predetermined sending parameters, depending on the form of change of the predetermined sending parameters and specific details of the send results, not all of the pieces of information are necessarily important for the predetermined sending processing apparatus. For example, when, even though the transmission module gradually changes the predetermined sending parameters, the send result does not change during the change of the predetermined sending parameters, there are cases where the predetermined processing apparatus can grasp, based on summarized information, details of the processing for eliminating the sending failure autonomously performed by the transmission module, without the necessity for all the pieces of information during the change of the predetermined sending parameters to be delivered to the predetermined processing apparatus as is. Thus, in such cases, an increase in traffic related to the collection of resend result information can be suppressed by forming a part or all of the resend result information as summarized information.

Here, in the foregoing transmission module, the resend result information may be appended to new predetermined send information that is newly sent by the sending means after the sending completion state of the predetermined send information resent by the resending means has been confirmed, and sent toward the information processing apparatus together with the new predetermined send information. With this configuration, the predetermined send information and the resend result information can be efficiently collected into the information processing apparatus. Note that the new predetermined send information to which the resend result information is to be appended may be information that is sent immediately after the sending completion state has been confirmed, or may be predetermined send information that is sent the next time after sending of predetermined send information is performed one time or a plurality of times after the sending completion state has been confirmed. In the former case, the information processing apparatus can quickly learn of the occurrence of the sending failure and the details of measures taken to eliminate the sending failure.

Here, the foregoing transmission module may further include receiving means for receiving upstream resend result information from an upstream transmission module that is located upstream of the own transmission module on the predetermined transmission path, the upstream resend result information corresponding to the resend result information generated in the upstream transmission module. In this case, the resend result information acquired by the acquiring means may be sent toward the predetermined processing apparatus together with the upstream resend result information received by the receiving means. When pieces of information regarding sending failures that have respectively occurred in a plurality of transmission modules are collectively sent to the predetermined processing apparatus in this manner, resend result information can be efficiently collected into the predetermined processing apparatus while suppressing an increase in traffic on the predetermined transmission path.

Moreover, the foregoing transmission module may further include a memory that stores the predetermined send information. Also, if the sending failure occurs, the resending means may change a part or all of the predetermined sending parameters with respect to which the sending failure has occurred and resend the predetermined send information while retaining the information in the memory. In this manner, when the information in the memory is retained while changing of the predetermined sending parameters and resending of the predetermined send information are performed in order to eliminate the sending failure, the predetermined send information can be prevented from being lost, and continuous collection of information into the information processing apparatus can be ensured. In particular, when compared with the case of a conventional technique that attempts to eliminate a sending failure by performing resetting, the predetermined send information can be more reliably delivered to the information processing apparatus.

Here, the foregoing transmission module may further include a sensor that detects an environment parameter around the own transmission module or within the own transmission module, and in that case, the sending means may send the detected environment parameter as the predetermined send information. Note that this configuration does not prevent the transmission module from transmitting information other than environment parameters to the information processing apparatus along the predetermined transmission path as predetermined send information.

Moreover, an aspect of the invention of the present application can also be construed as a network system configured to transmit predetermined send information constituting information to be processed by an information processing apparatus along a predetermined transmission path on which the information processing apparatus is present via a plurality of transmission modules. In this case, at least one transmission module of the plurality of transmission modules has sending means for sending the predetermined send information from the own transmission module to a downstream transmission module on the predetermined transmission path in accordance with predetermined sending parameters that are set for sending of the predetermined send information from the own transmission module to the downstream transmission module, the downstream transmission module being located downstream of the own transmission module on the predetermined transmission path, confirming means for confirming a sending completion state in which the predetermined send information has been received by the downstream transmission module or has reached the information processing apparatus, resending means for changing, if a sending failure in which the sending completion state of the predetermined send information is not confirmed by the confirming means occurs, a part or all of the predetermined sending parameters used for sending of the predetermined send information with respect to which the sending failure has occurred, and resending the predetermined send information in accordance with the predetermined sending parameters after the changing, and acquiring means for acquiring the predetermined sending parameter changed by the resending means between the occurrence of the sending failure and confirmation of the sending completion state of the predetermined send information resent by the resending means, and resend result information related to a send result corresponding to the changed predetermined sending parameter. The at least one transmission module sends the resend result information acquired by the acquiring means toward a predetermined processing apparatus. Note that the technical ideas that have been disclosed with respect to the aspect of the invention of the transmission module are applicable to the aspect of the invention of this information transmission network system as long as no technical inconsistency arises.

Moreover, an aspect of the invention of the present application may also be construed as an information transmission method for transmitting predetermined send information to be processed by an information processing apparatus along a predetermined transmission path on which the information processing apparatus is present via a transmission module that transmits the predetermined send information. In this case, the method includes a sending step of sending the predetermined send information from the own transmission module to a downstream transmission module on the predetermined transmission path in accordance with predetermined sending parameters that are set for sending of the predetermined send information from the own transmission module to the downstream transmission module, the downstream transmission module being located downstream of the own transmission module on the predetermined transmission path, a confirming step of confirming a sending completion state in which the predetermined send information has been received by the downstream transmission module or has reached the information processing apparatus, a resending step of changing, if a sending failure in which the sending completion state of the predetermined send information is not confirmed in the confirming step occurs, a part or all of the predetermined sending parameters used for sending of the predetermined send information with respect to which the sending failure has occurred, and resending the predetermined send information in accordance with the predetermined sending parameters after the changing, an acquiring step of acquiring the predetermined sending parameter changed in the resending step between the occurrence of the sending failure and confirmation of the sending completion state of the predetermined send information resent in the resending step, and resend result information related to a send result corresponding to the changed predetermined sending parameter, and a step of sending the resend result information acquired in the acquiring step toward a predetermined processing apparatus. Note that the technical ideas that have been disclosed with respect to the aspect of the invention of the transmission module are applicable to the aspect of the invention of this information transmission method as long as no technical inconsistency arises.

Moreover, an aspect of the present invention can also be construed as an information transmission program for causing a transmission module that transmits predetermined send information to be processed by an information processing apparatus to execute processing constituted by the following steps. In this case, the information transmission program causes the transmission module to execute a sending step of sending the predetermined send information from the own transmission module to a downstream transmission module on the predetermined transmission path in accordance with predetermined sending parameters that are set for sending of the predetermined transmission path from the own transmission module to the downstream transmission module, the downstream transmission module being located downstream of the own transmission module on the predetermined send information, a confirming step of confirming a sending completion state in which the predetermined send information has been received by the downstream transmission module or has reached the information processing apparatus, a resending step of changing, if a sending failure in which the sending completion state of the predetermined send information is not confirmed in the confirming step occurs, a part or all of the predetermined sending parameters used for sending of the predetermined send information with respect to which the sending failure has occurred, and resending the predetermined send information in accordance with the predetermined sending parameters after the changing, an acquiring step of acquiring the predetermined sending parameter changed in the resending step between the occurrence of the sending failure and confirmation of the sending completion state of the predetermined send information resent in the resending step, and resend result information related to a send result corresponding to the changed predetermined sending parameter, and a step of sending the resend result information acquired in the acquiring step to a predetermined processing apparatus. Note that the technical ideas that have been disclosed with respect to the aspect of the invention of the transmission module are applicable to the aspect of the invention of this information transmission program as long as no technical inconsistency arises.

Effects of the Invention

It is possible for a transmission module that belongs to a network for information transmission to, when a communication problem has occurred, quickly eliminate the communication problem and collect information regarding the communication problem into a processing apparatus.

BRIEF DESCRIPTION OF THE DRAWINGS

FIG. 5 schematically shows a data structure of the send information to be transmitted in the transmission processing illustrated in FIG. 4.

FIG. 6A schematically shows a state in which a sending failure has occurred between transmission modules in the network system shown in FIG. 1.

FIG. 6B schematically shows a state in which, after the occurrence of the sending failure shown in FIG. 6A, a sending parameter of a transmission module associated with the sending failure is changed, and a new transmission path is formed.

FIG. 12 is a second diagram illustrating specific details of data of the send information shown in FIG. 9 and containing the resend result information.

EMBODIMENTS OF THE INVENTION

A network system (hereinafter sometimes simply referred to as "network") 10 according to the present invention and transmission modules 2 and 3 included in the network will be described with reference to the drawings. Note that the configurations of embodiments below are merely examples, and the present invention is not limited to the configurations of these embodiments.

Embodiment 1

Figure 1:
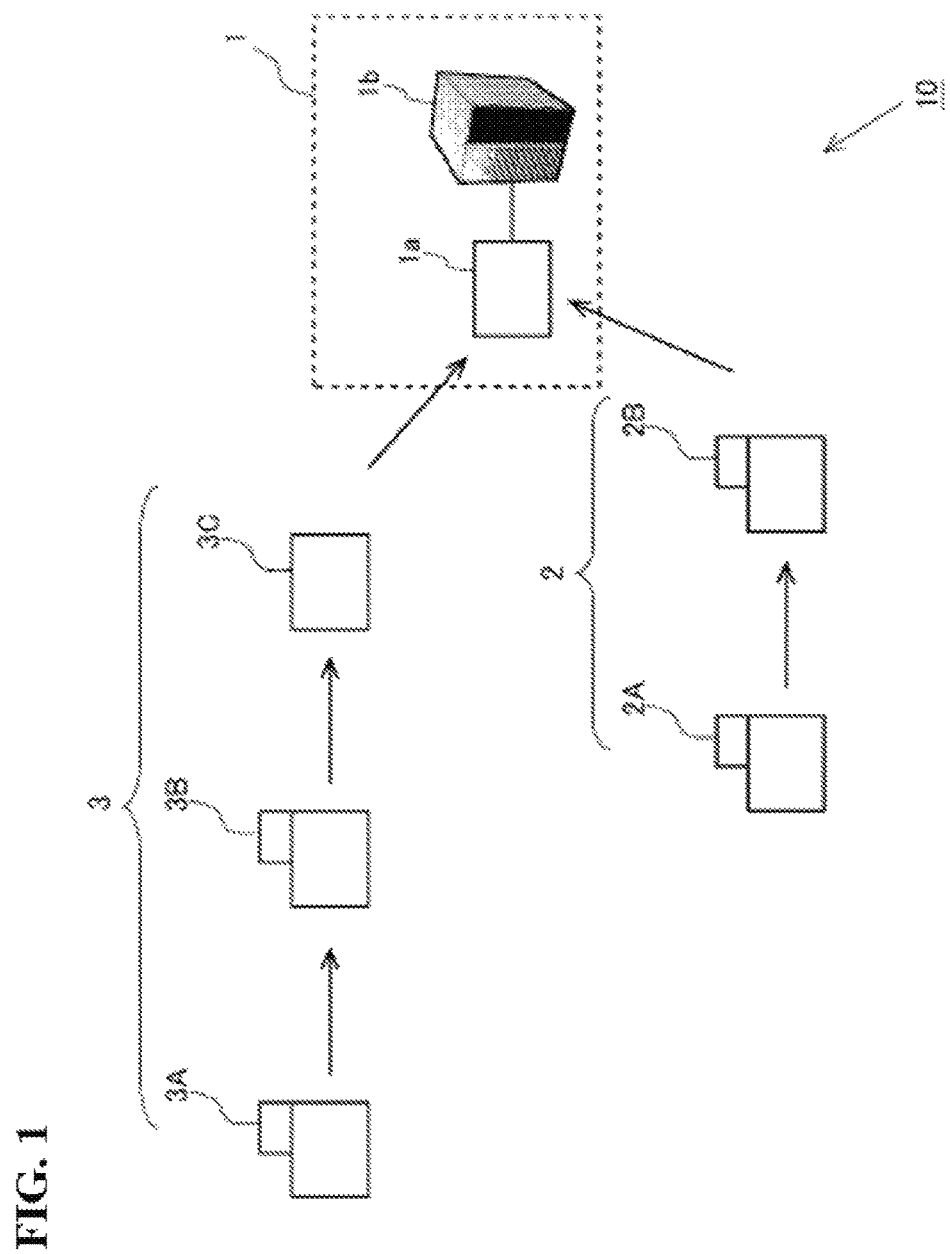
FIG. 1 shows a schematic configuration of a network system according to the present invention.

FIG. 1 shows a schematic configuration of the network 10. Transmission modules equipped with sensors for measuring various external environment parameters (temperature etc.) or a transmission module not equipped with such sensors and having only a relay function belong to the network 10, and the network is formed such that the various transmission modules function in such a manner as to collect external environment parameters that have been measured into an information processing apparatus 1. In the network 10 shown in FIG. 1, two transmission paths are formed between the information processing apparatus 1 and the transmission modules, and those transmission modules that are present on one transmission path are denoted by the same reference numeral (2 or 3). Moreover, in the case where a plurality of transmission modules on one transmission path are distinctively described, the reference numerals 2 and 3 of the transmission modules are followed by characters ("A", "B", etc.) for individual identification.

Specifically, a transmission path on which the plurality of transmission modules 2 are present and a transmission path on which the plurality of transmission modules 3 are present are formed in the network 10. Transmission modules 2A and 2B equipped with the aforementioned sensors are on the former transmission path. Transmission modules 3A and 3B equipped with the aforementioned sensors and a transmission module 3C not equipped with such sensors and having only the relay function are on the latter transmission path. Note that in the network 10 shown in FIG. 1, the transmission modules perform wireless communication with one another, and the order of relay performed by the transmission modules on each transmission path is determined in accordance with sending parameters that are set for use ha sending of information, in each transmission module. Note that the sending parameters include a plurality of parameters that determine not only the order of relay but also various sending conditions with respect to sending of information. Details of the sending parameters will be described later. Note that in the network 10, it is assumed that send information transmitted along the transmission path on which the transmission modules 2 are present is transmitted in the order of the transmission modules 2A and 2B, send information transmitted along the transmission path on which the transmission modules 3 are present is transmitted in the order of the transmission modules 3A, 3B, and 3C, and the send information is ultimately transmitted from the transmission modules 2B and 3C to the information processing apparatus 1, which is the destination of these paths.

Here, the information processing apparatus 1 has a sending/receiving apparatus 1a and a server 1b. The sending/receiving apparatus 1a is an apparatus for receiving information transmitted from the transmission modules 2B and 3C that are located nearest to the information processing apparatus 1 on their respective transmission paths and sending information to the transmission modules 2B and 3C in order to deliver a predetermined operational command and notification to the transmission modules located on the transmission paths. Thus, the information processing apparatus 1 is also considered as an apparatus that manages the entire network 10. The sending/receiving apparatus 1a is electrically connected to the server 1b. The server 1b collects information measured by the sensors of for example, the transmission modules 2A and 2B and the transmission modules 3A and 3B and performs predetermined information processing.

Note that measurement by the sensors of the transmission modules 2A and 2B and the transmission modules 3A and 3B as well as transmission of the measured data to the information processing apparatus 1 are repeatedly executed at predetermined intervals (e.g., at a regular interval) after power-on of the transmission modules, in order to continuously collect information. Moreover, among the transmission modules 2 and 3 shown in FIG. 1, those transmission modules that are equipped with the sensors are each configured as a small device having a sensor function for measuring a measurement target, a function for recording and processing measured information, a wireless function intended for the outside of the transmission modules, a power source function, and the like, while the transmission module equipped with no sensor is configured as a small device having a wireless function intended for the outside of the transmission module, a power source function, and the like.

Examples of the sensors of these transmission modules 2 and 3 include physical sensors such as temperature sensors, humidity sensors, acceleration sensors, illuminance sensors, flow sensors, pressure sensors, ground temperature sensors, and particle sensors, and chemical sensors such as $CO_2$ sensors, pH sensors, EC sensors, and soil moisture sensors. In the present embodiment, for the sake of simplicity, it is assumed that the transmission modules 2 are equipped with temperature sensors for measuring an external temperature at their respective locations, and temperature data measured in the transmission modules 2A 2B, 3A, and 3B is used for predetermined information processing in the server 1b.

Here, in the network 10, when measurement is performed by a sensor, the measured data is relayed by a plurality of transmission modules as send information and ultimately delivered to the information processing apparatus 1. However, since send information is transmitted in a wireless manner in the network 10, if the transmission environment is unfavorable (for example, radio interference from other wireless apparatuses outside the transmission path occurs, or an obstacle is temporarily present between transmission modules), a sending failure may occur in which a sending completion state with respect to information sent between transmission modules cannot be confirmed from the source of that information. If this sending failure continues, smooth collection of send information into the information processing apparatus 1 is inhibited. Therefore, it is necessary to quickly eliminate the sending failure. Generally, there are cases where a central device (base station or the like) that manages the entire network adjusts communication conditions between the transmission modules while taking the communication status of the network into consideration. However, since the sending failure is occurring between transmission modules, an adjustment instruction from such a central device may fail to reach a transmission module that is located at a distal end. In that case, it is clearly difficult to quickly eliminate the sending failure.

Moreover, the transmission modules are each equipped with a memory that temporarily stores measured data acquired by a sensor, information received from an upstream transmission module, or the like for future downstream transmission. In certain cases, resetting of a transmission module itself is performed as a method for eliminating a sending failure. However, generally, resetting initializes the transmission module. Thus, information in its memory is lost, and the transmission module is unable to function for a period of time required for initialization. Therefore, collection of information into the information processing apparatus 1 is also inhibited.

To address these issues, in the network 10 according to the present invention, when a sending failure has occurred, a transmission module that grasps the sending failure autonomously eliminates the failure state by itself, and performs processing (hereinafter referred to as "transmission processing") for resending the information that was unable to be sent. Thus, send information can be smoothly and quickly collected into the information processing apparatus 1.

On the other hand, when the transmission module itself autonomously attempts to eliminate the sending failure, the conditions of sending between transmission modules are changed outside the management range, in a sense, of the information processing apparatus 1 that manages the network 10. For this reason, the information processing apparatus 1 cannot learn of what kind of sending failure the transmission module has undergone, how the transmission module has eliminated the sending failure, and so on. If the transmission modules individually and freely adjust the sending conditions and the like, congestion of information may occur on the network 10 and inhibit preferable sending of information. This may cause a state that cannot be overlooked in light of preferable collection of information. To address this issue, the transmission module performs processing (hereinafter "resend result information sending processing") for delivering resend result send information regarding the sending failure to the information processing apparatus 1, in addition to the above-described autonomous transmission processing. This enables the information processing apparatus 1 to grasp a status regarding a sending failure on the network 10 using collected resend result send information and manage the transmission modules 2 and 3 so that preferable sending of information is performed.

Figure 2:
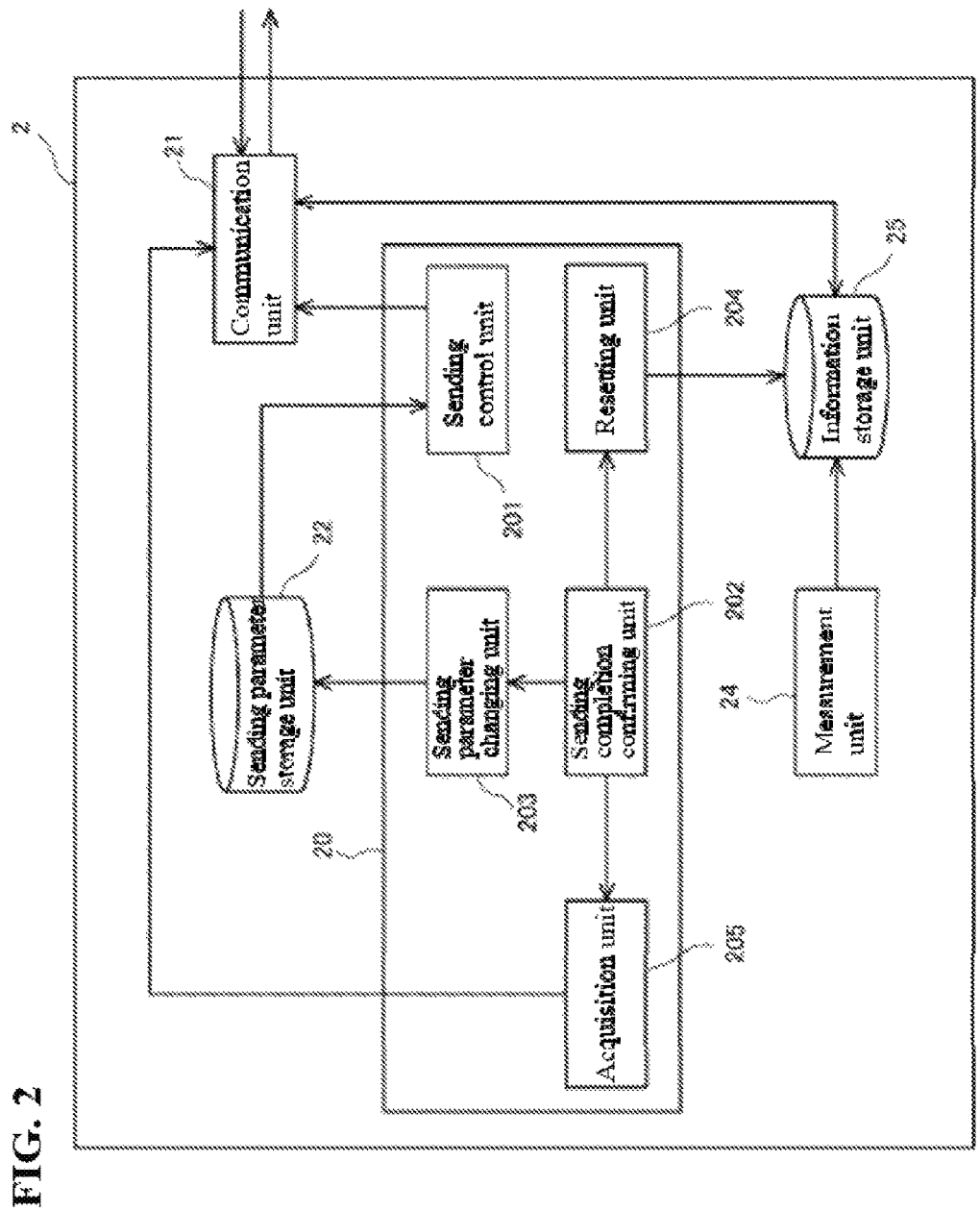
FIG. 2 is a functional block diagram of a transmission module included in the network system shown in FIG. 1.

Based on the foregoing description, specific processing that is performed by the transmission modules 2 and 3 and the information processing apparatus 1 in the network 10 will be described. The transmission modules 2 and 3 each have an internal calculation apparatus, a memory, and the like and exert various functions due to the calculation apparatus executing a predetermined control program, FIG. 2 shows functional blocks representing a part of the various functions exerted by the transmission modules 2 that belong to the network 10. Note that although FIG. 2 specifically shows the functional blocks with respect to the transmission modules 2 equipped with the sensors, the transmission modules 3A and 3B equipped with the sensors also have similar functional units. The transmission module 3C equipped with no sensor has functions similar to those of the transmission modules 2 except for the functions related to the sensors. Moreover, the transmission modules equipped with the sensors are each configured such that temperature data measured by the temperature sensor of the transmission module is stored in the memory, and the measured data is sent to a downstream transmission module by a communication unit 21, which will be described later.

Here, each transmission module 2 has a control unit 20, the communication unit 21, a sending parameter storage unit 22, a measurement unit 24, and an information storage unit 25 as functional units. Note that the power for driving the transmission module 2 may be supplied from a battery built into the module or may be supplied from an AC power supply or the like outside the module. Hereinafter, the functional units included in the transmission module 2 will be described.

The control unit 20 is a functional unit that performs various kinds of control in the transmission module 2, and notably has a sending control unit 201, a sending completion confirming unit 202, a sending parameter changing unit 203, a resetting unit 204, and an acquisition unit 205. This sending control unit 201 is a functional unit that sends send information from the own transmission module to a downstream transmission module via the communication unit 21, which will be described later, in accordance with sending parameters held in the sending parameter storage unit 22, which will be described later. These sending parameters include a plurality of parameters that determine the conditions of sending of information in the own transmission module. Details of the sending parameters will be described later. Note that the sending control unit 201 itself sends information in accordance with the sending parameters as described above and functions as sending means according to the present invention; however, if sending of send information fails and afterwards the send information is sent again, the sending control unit 201, together with the sending parameter changing unit 203, which will be described later, functions as resending means according to the present invention. Furthermore, the sending control unit 201 is also involved in sending of resend result information acquired by the acquisition unit 205, which will be described later.

Moreover, the sending completion confirming unit 202 is a functional unit that confirms that, when the sending control unit 201 has executed sending of send information, the sent send information has reached a downstream transmission module that is a direct sending destination, or the information processing apparatus 1, which is the final sending destination. This sending completion confirming unit 202 corresponds to confirming means according to the present invention. For example, in the case where the downstream transmission module or the information processing apparatus 1 is designed such that when the downstream transmission module or the information processing apparatus 1 has received send information from the own transmission module, the downstream transmission module or the information processing apparatus 1 sends an acknowledge signal (reception notification) corresponding to reception of that information to the own transmission module, the sending completion confirming unit 202 confirms completion of the sending to the sending destination by confirming whether the acknowledge signal has been received. If the sending completion confirming unit 202 cannot confirm the state in which sending to the sending destination is complete, this means that a sending failure has occurred in the own transmission module. Moreover, the sending parameter changing unit 203 is a functional unit that changes a part or all of the sending parameters held in the sending parameter storage unit 22, which will be described later, based on the result of the confirmation of completion of the sending by the sending completion confirming unit 202. Moreover, the resetting unit 204 is a functional unit that executes initialization with respect to a control system of the own transmission module. Initialization by the resetting unit 204 results in initialization of the sending parameters stored in the sending parameter storage unit 22 and loss of various kinds of data stored in the information storage unit 25, which will be described later.

Next, the acquisition unit 205 acquires resend result information, which is information regarding the sending failure confirmed by the sending completion confirming unit 202. This resend result information is related to sending parameters that have been used between the occurrence of a sending failure in the sending of information from the own transmission module to the downstream transmission module and the elimination of the sending failure, and to the result of sending of information in accordance with the sending parameters. That is to say, the resend result information enables the information processing apparatus 1 that has received the resend result information to grasp details about what kind of sending failure has occurred in the transmission module and how the sending parameter changing unit 203 of that transmission module has autonomously changed a sending parameter to eliminate the sending failure. Note that specific details of the resend result information will be described later. Then, the resend result information acquired by the acquisition unit 205 is sent toward the information processing apparatus 1 via the communication unit 21 under the control of the sending control unit 201.

Next, the communication unit 21 performs sending and reception of information to and from the outside via an antenna of the own transmission module. Specifically, the communication unit 21 performs sending to a downstream transmission module in accordance with an instruction from the sending control unit 201 and reception of send information sent from an upstream transmission module. Note that the antenna provided in the own transmission module has a diversity function, and the communication unit 21 turns ON and OFF the diversity function as necessary to adjust the receiving capability of the own transmission module. Moreover, the communication unit 21 is formed such that when the communication unit 21 has received send information from an upstream transmission module, the communication unit 21 issues an acknowledge signal indicating the reception of the send information, to the upstream transmission module.

Next, the sending parameter storage unit 22 is a functional unit that holds the sending parameters, which determine the sending conditions for the sending of send information by the sending control unit 201, in the memory of the own transmission module. Specific configurations of the sending parameters range widely, five sending parameters significantly related to the present invention will be described below as typical examples.

(1) Parameter Related to Enabling of Antenna Diversity

This parameter is a parameter for setting ON and OFF of the antenna diversity function of the transmission module. In the present application, this parameter will be referred to as "diversity parameter" below. When the antenna diversity function is turned ON, while the receiving capability of the own transmission module is improved, the power consumption required for reception slightly increases.

(2) Parameter Related to Sending Power

This parameter is a parameter related to sending strength of send information from the transmission module. In the present application, this parameter will be referred to as "sending power parameter" below. When the sending power is increased, an area in which sending from the transmission module is possible is expanded, and transmission is unlikely to be affected by an obstacle or the like that is located near the transmission module; however, on the other hand, the power consumption required for sending increases.

(3) Parameter Related to Node Address of Transmission Module Serving as Sending Destination This parameter is a parameter for identifying a downstream transmission module that belongs to the same network as the own transmission module and that serves as a sending destination of the own transmission module. In the present application, this parameter will be referred to as "node parameter" below. In the network 10 shown in FIG. 1, the node address of the transmission module 2B is set as the node parameter in the transmission module 2A.

(4) Parameter Related to Network

This parameter is a parameter for identifying a network over which the own transmission module transmits send information with the information processing apparatus 1 being positioned at the top end as shown in FIG. 1. In the present application, this parameter will be referred to as "network parameter" below. In the network 10 shown in FIG. 1, the same value for identifying the network 10 is set as the network parameter in all of the transmission modules 2 and 3.

(5) Parameter Related to Channel

This parameter is a parameter related to a transmission channel for use in information transmission between transmission modules. In the present application, this parameter will be referred to as "channel parameter" below. Generally, a common channel parameter is set in all transmission modules that belong to the same network.

Note that a part or all of the above-described sending parameters (1) to (5) that are stored in the sending parameter storage unit 22 can be changed in accordance with an instruction from the sending parameter changing unit 203. Moreover, if resetting by the resetting unit 204 is performed, the above-described sending parameters (1) to (5) stored in the sending parameter storage unit 22 are initialized and changed to initial sending parameters.

Next, the measurement unit 24 is a functional unit that measures an external environment parameter (e.g., external temperature) via the sensor (e.g., temperature sensor) of the own transmission module. Then, the measured data measured by the measurement unit 24 is stored in the memory of the own transmission module by the information storage unit 25. Moreover, the information storage unit 25 stores send information received from an upstream transmission module via the communication unit 21 when the own transmission module functions as a relay, and also resend result information in the upstream transmission module if the resend result information is appended to that send information as described below. Then, the above-described information stored by the information storage unit 25 is sent to a downstream transmission module via the communication unit 21 in accordance with an instruction from the communication control unit 201. Note that as a result of resetting by the resetting unit 204, the information stored in the information storage unit 25 is lost.

Figure 3:
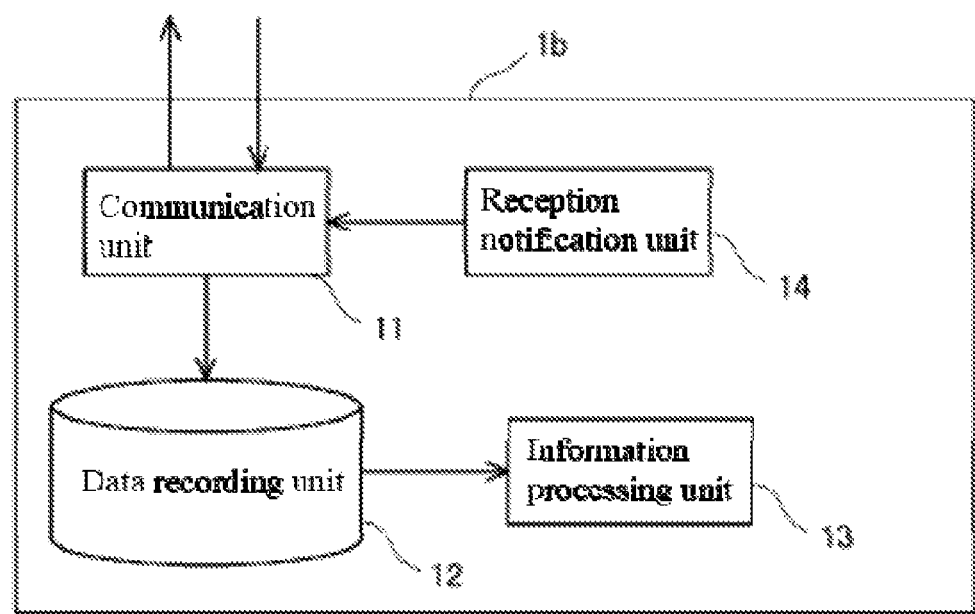
FIG. 3 is a functional block diagram of a server included in the network system shown in FIG. 1.

Next, functional units formed in the server 1b be described based on FIG. 3. The server 1b has a communication unit 11, a data recording unit 12, an information processing unit 13, and a reception notification unit 14. The communication unit 11 is a functional unit that communicates with a transmission module that is located nearest to the information processing apparatus 1 on the transmission path, in order to collect send information from the transmission module via the sending/receiving apparatus 1a. Specifically, the communication unit 11 performs sending and reception between the information processing apparatus 1 and the transmission modules 2B and 3C. The data recording unit 12 is a functional unit that records temperature data, which is the measured data contained in send information transmitted from the transmission modules 2 and 3 via the communication unit 11, and resend result information sent from the transmission modules. Then, the recorded measured data is passed to the information processing unit 13, and the information processing unit 13 performs predetermined information processing (e.g., processing for air-conditioning control of the space in which transmission modules are placed, using the collected measured data). Similarly, the recorded resend result information is also passed to the information processing unit 13, and processing related to management of the network 10 (e.g., processing for changing the transmission path if there is a possibility that the occurrence of congestion of information may be caused by the transmission path) is performed. Next, the reception notification unit 14 is a functional unit that issues a notification that the server 1b has received send information received from a transmission module via the communication unit 11 to the source transmission module of the send information.

Next, transmission processing in a transmission module will be described based on FIG. 4. Note that the transmission processing may be, for example, processing that is realized by the transmission module 2A shown in FIG. 1 executing a predetermined control program, and specific details of this processing will be described below. However, substantially the same transmission processing is applicable to the other transmission modules.

Moreover, FIG. 5 shows a data structure of send information transmitted by the transmission module 2A in the transmission processing. The upper part (a) of FIG. 5 schematically shows the overall data structure of the send information, and the send information is roughly divided into eight areas. In the present embodiment, five areas a1 to a5 of the eight areas that are particularly important will be described. The area a1 (Start Symbol) is a specific byte string indicating the start of the send information. The area a2 (Destination Address) indicates the address of the destination (information processing apparatus 1 in the case of the present embodiment) to which the send information is to be ultimately transmitted. The area a3 (Source Address) indicates the address of the source (transmission module 2A in the case of the present embodiment) of the send information. The area a4 (Data) stores measured temperature data measured by the temperature sensor of the transmission module 2A, which is the source. The area a5 (Terminator Symbol for Data) is a specific byte string indicating the end of the send information.

Next, the lower part (b) of FIG. 5 shows an example of the measured temperature data stored in the area a4. In the present embodiment, in the transmission module 2A, temperature data of two measurements that have been performed after the immediately previous transmission of send information is stored in the area a4. Specifically, temperature data T1 acquired at time t10 and temperature data T2 acquired at time t20 are stored in the area a4 in the order in which they were acquired. The reason for this is that the transmission module 2A is designed such that instead of transmitting measured data to the transmission module 2B each time data measurement is performed by the temperature sensor, the transmission module 2A collectively transmits measured data of a plurality of measurements. It goes without saying that the form of measured data to be transmitted is not limited to the form shown in FIG. 5(b).

Transmission Processing

Here, returning to FIG. 4, transmission processing executed by the transmission module 2A will be described. First, in S101, the sending control unit 201 judges whether or not it is the sending time that the own transmission module 2A should send information to the transmission module 2B, which is located downstream of the own transmission module 2A. Then, if the result of judgment in S101 is affirmative, the processing proceeds to S102, whereas if the result of judgment is negative, the processing in S101 is performed again.

Next, in S102, the sending control unit 201 forms send information in a state in which the area a4 of the send information to be sent to the transmission module 2B stores measured temperature data stored in the information storage unit 25, and sends the send information to the transmission module 2B via the communication unit 21. Note that this sending is executed in accordance with sending parameters stored in the sending parameter storage unit 22, that is, sending parameters including the diversity parameter, the sending power parameter, the node parameter, the network parameter, and the channel parameter. When the processing in S102 is complete, the processing proceeds to S103.

In S103, the sending completion confirming unit 202 judges whether or not a sending failure in which completion of the sending of the send information to the transmission module 2B was not confirmed has occurred. Specifically, after sending of send information, if an acknowledge signal that is to be sent by the transmission module 2B receiving the send information has not been confirmed by the sending completion confirming unit 202 within a predetermined period of time after the sending of the send information, it is judged that a sending failure has occurred. Moreover, even when the acknowledge signal has returned, if the transmission module 2A is notified of the occurrence of a situation in which the transmission module 2B cannot suitably receive the send information or a situation in which any error has occurred in the transmission module 2B along with the acknowledge signal, it may be judged that a sending failure has occurred. If the result of judgment in S103 is affirmative, the processing proceeds to S104, whereas if the result of judgment is negative, the transmission processing is ended.

Next, in S104, it is judged whether or not the number of times the send information is resent in the transmission processing, that is, the number of times the send information is resent in S106, which will be described below, has reached a predetermined number of times. Then, if the result of judgment in S104 is affirmative, the processing proceeds to S107, and resetting by the resetting unit 204 is executed to end the present transmission processing. On the other hand, if the result of judgment in S104 is negative, the processing proceeds to S105. In S105, in order to eliminate the sending failure that is currently occurring, the sending parameter changing unit 203 changes a part of the sending parameters (the diversity parameter, the sending power parameter, the node parameter, the network parameter, the channel parameter, and the like) stored in the sending parameter storage unit 22. After that, in S106, in accordance with the changed sending parameters, the sending control unit 201 resends the send information that failed to be sent, that is, the send information with respect to which completion of the sending to the transmission module 2B has not been confirmed. Then, when the processing in S106 is complete, the processing in S103 is performed again to judge the occurrence of a sending failure regarding the resent send information. Note that while the processing in S103 to S106 is performed, resetting by the resetting unit 204 of the own transmission module 2A is not performed, and therefore no information stored in the information storage unit 25 is lost.

Here, changing of a sending parameter in S105 will be described in detail. In the present embodiment, the above-described five parameters, namely, the diversity parameter, the sending power parameter, the node parameter, the network parameter, and the channel parameter are described as examples of the sending parameter to be changed. Hereinafter, the processing in S105 corresponding to each parameter will be described.

(1) A Case Where Diversity Parameter Is Changed

When a sending failure occurs in the own transmission module 2A in a state in which the antenna diversity function is disabled, it can be considered that the sending failure has occurred because, despite the fact that send information was received by the transmission module 2B and an acknowledge signal was sent from the transmission module 2B, the own transmission module 2A was not able to properly receive the acknowledge signal. Thus, it is determined that enabling the antenna diversity function and thereby improving the receiving capability of the own transmission module 2A is useful as a method for eliminating the sending failure.

Specifically, the own transmission module 2A performs, as the processing in S105, processing for changing the diversity parameter stored in the sending parameter storage unit 22 to a value corresponding to enabling of the function. After that, the sending control unit 201 resends the send information in accordance with the sending parameters stored in the sending parameter storage unit 22, the sending parameters including the changed diversity parameter.

(2) A Case Where Sending Power Parameter Is Changed

When sending power of the own transmission module 2A is set at a high value, its sending capability can be improved. However, for example, the power consumption of the own transmission module 2A increases, and interference with a neighboring wireless network occurs. For this reason, the sending power of the own transmission module 2A is usually set at a somewhat suppressed value. Thus, there are cases where a sending failure that may occur due to the presence of an obstacle between transmission modules can be eliminated by increasing the sending power of the own transmission module 2A.

Specifically, the own transmission module 2A performs, as the processing in S105, processing for increasing the sending power parameter stored in the sending parameter storage unit 22. After that, the sending control unit 201 resends the send information in accordance with the sending parameters stored in the sending parameter storage unit 22, the sending parameters including the changed sending power parameter. Note that as the processing for increasing the sending power parameter, for example, the sending power parameter may be changed so that the sending power gradually increases in order to minimize interference with a neighboring network, or the sending power parameter may be changed so that the highest sending power that can be set in the own transmission module 2A is achieved in order to quickly eliminate the sending failure.

(3) A Case Where Node Parameter Is Changed

Changing of the node parameter will be described based on FIGS. 6A and 6B. FIG. 6A shows a state in which a sending failure has occurred between the transmission modules 2A and 2B of the network 10 (i.e., a state in which the result of judgment in S103 is affirmative). At this time, the own transmission module 2A broadcasts a message to search for a newly connectable transmission module as a direct sending destination to which the own transmission module 2A can be connected, to transmission modules that are present around the own transmission module 2A. This message may include, for example, a command for a transmission module receiving the message to return the node address to identify that transmission module and the device type of that transmission module.

The own transmission module 2A receives a reply from transmission modules that have received the above-described message and selects a transmission module to serve as the new sending destination out of the transmission modules that have sent a reply. For example, based on information on the device type that is contained in the reply, a transmission module that is to serve as the new sending destination is determined out of the transmission modules excluding the transmission modules of the type to which the own transmission module 2A is unable to connect to (e.g., the transmission modules that do not have the relay function). This determination is reflected in the node parameter stored in the sending parameter storage unit 22, and thereby the sending parameter is changed. After that, the sending control unit 201 resends the send information in accordance with the sending parameters stored in the sending parameter storage unit 22, the sending parameters including the changed node parameter.

In the case of the present embodiment, as a result of the own transmission module 2A broadcasting the above-described message, the transmission module 3A is selected as a connectable transmission module, and the node parameter is changed in S105 so that the transmission module 3A is set as a new connection destination in the transmission module 2A as shown in FIG. 6B. Note that details of changing of the node parameter will be described later in Embodiment 2.

(4) A Case Where Network Parameter Is Changed

Changing of the network parameter will be described based on FIGS. 7A and 7B. A network shown in these two drawings include a network N2 formed by the transmission modules 2 and a network N3 formed by the transmission modules 3. An information processing apparatus 4 is positioned at the top end in the network N2, and an information processing apparatus 5 is positioned at the top end in the network N3. The information processing apparatuses 4 and 5 have a sending/receiving apparatus 4a and 5a and a server 4b and 5b, respectively, as in the case of the information processing apparatus 1. The two information processing apparatuses are electrically connected to each other so that information can be exchanged therebetween, and a common database DB is constructed.

Figure 7A:
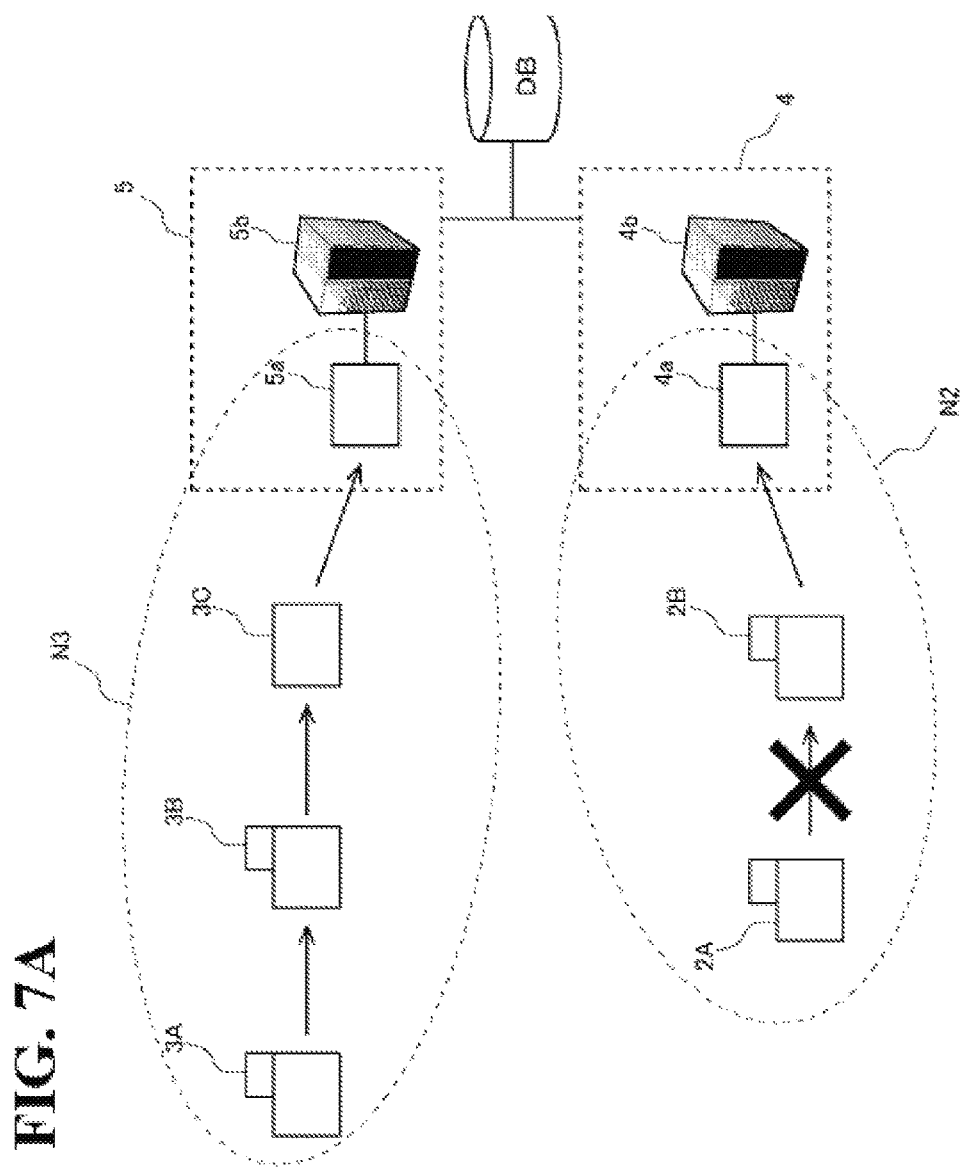
FIG. 7A schematically shows a state in which a sending failure has occurred between transmission modules of a second network system according to the present invention.
Figure 7B:
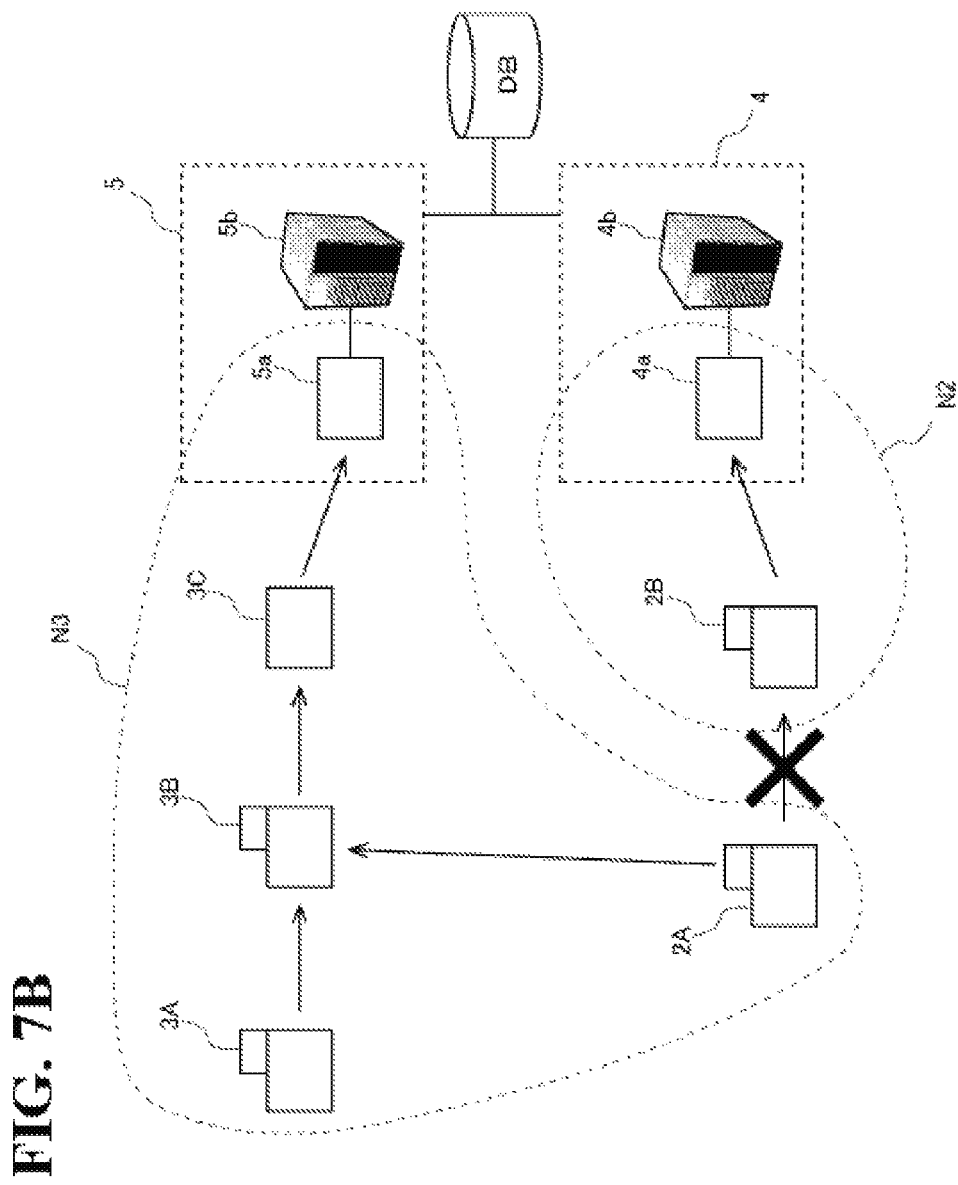
FIG. 7B schematically shows a state in which, after the occurrence of the sending failure shown in FIG. 7A, a sending parameter of a transmission module associated with the sending failure is changed, and a new transmission path is formed.

Here, FIG. 7A shows a state in which a sending failure has occurred between the transmission modules 2A and 2B in the network N2 (i.e., the result of judgment in S103 is affirmative). At this time, the own transmission module 2A broadcasts a message to search for a newly connectable transmission module to serve as a direct sending destination to which the own transmission module 2A can be connected, to transmission modules that are present in a network other than the network that the own transmission module 2A belongs to. Note that since different networks may use different communication channels, the above-described broadcasting is performed using various communication channels that can be used by the own transmission module 2A. Moreover, the above-described message may contain, for example, a command for a transmission module receiving the message to return a network name to identify the network that the transmission module belongs to, the communication channel used in the network, and a received strength signal RSSI of the message.

The own transmission module 2A receives a reply from the transmission modules 3A and 3B that belong to the network N3 and that have received the above-described message, and selects a transmission module to serve as a new sending destination out of transmission modules that have sent a reply. For example, based on information on the received strength signal RSSI contained in the reply, a transmission module that is likely to most reliably receive the send information from the own transmission module 2A is determined as a new sending destination. This determination is reflected in the network parameter stored in the sending parameter storage unit 22, and thus the sending parameter is changed. After that, the sending control unit 201 resends the send information in accordance with the sending parameters stored in the sending parameter storage unit 22, the sending parameters including the changed network parameter.

In the case of the present embodiment, it is assumed that as a result of the own transmission module 2A broadcasting the above-described message, the transmission modules 3A and 3B that belong to the network N3 are searched for as connectable transmission modules. Here, with respect to which transmission module of the searched transmission modules 3A and 3B is selected, it is assumed that the transmission module 3B having the larger value of the received signal strength RSSI is selected. For this reason, in the present embodiment, with regard to the own transmission module 2A, the network parameter stored in the sending parameter storage unit 22 and, if necessary, the channel parameter related to the communication channel for connection to the network N3 are changed in S105 so that the network to which the own transmission module 2A belongs is changed from N2 to N3 as shown in FIG. 7B.

(5) A Case Where Channel Parameter Is Changed

There is a possibility that a sending failure may occur because the transmission channel in the own transmission module 2A that should be used between itself and the transmission module 2B serving as a sending destination is different. In this case, it is considered useful to change the transmission channel as a method for eliminating the sending failure. Thus, the own transmission module 2A performs, as the processing in S105, processing for changing the channel parameter stored in the sending parameter storage unit 22. After that, the sending control unit 201 resends the send information in accordance with the sending parameters stored in the sending parameter storage unit 22, the sending parameters including the changed channel parameter.

Note that in S105, if a plurality of sending parameters are to be changed, the sending parameters may be changed individually, or as an alternative method, the plurality of sending parameters may be changed in combination. Moreover, changing of a sending parameter in S105 is repeated as long as the result of judgment in S103 is affirmative and the result of judgment in S104 is negative. The order in which sending parameters are changed is not limited to a specific order, and can be appropriately set in accordance with a predetermined purpose.

Figure 4:
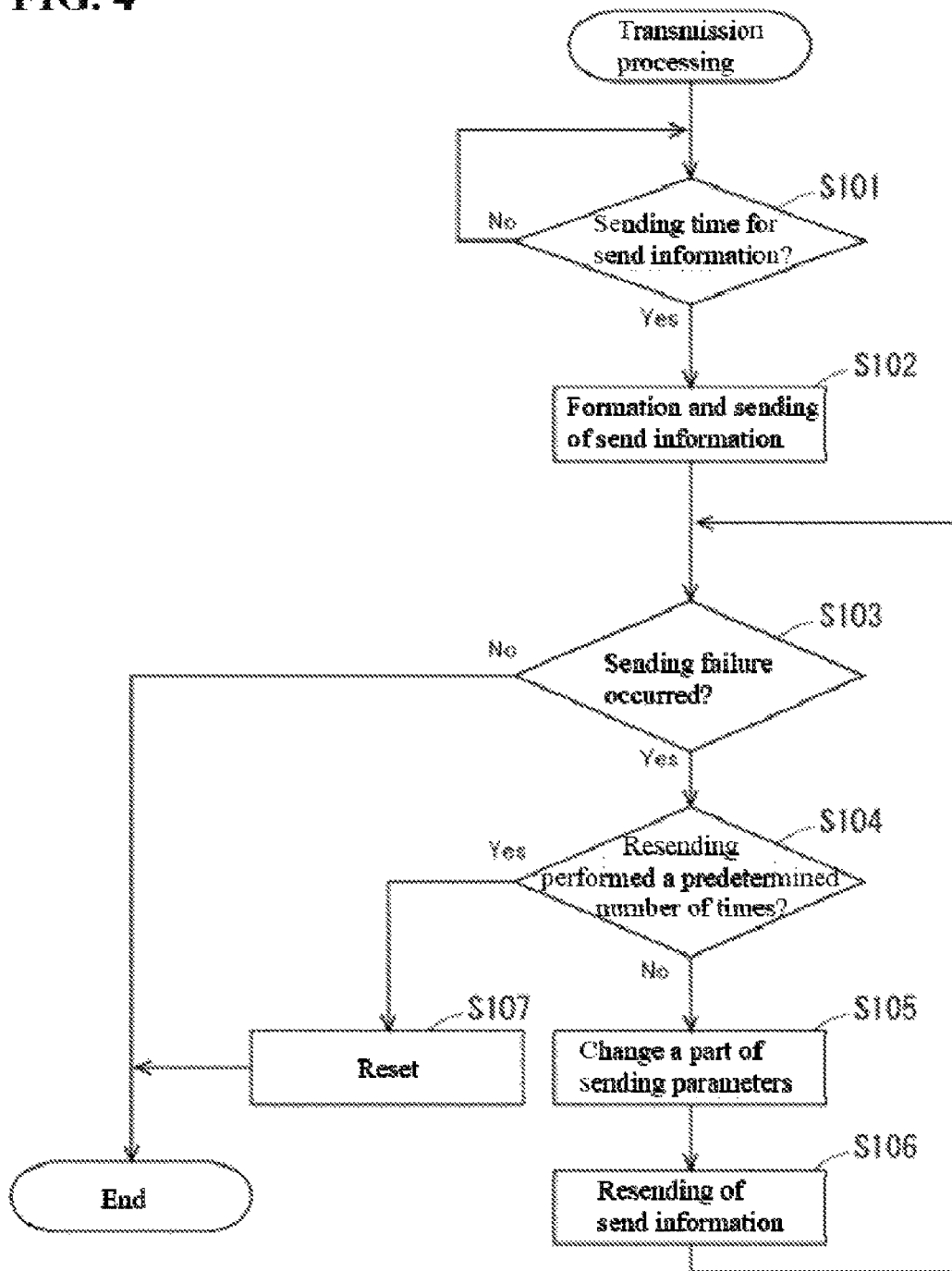
FIG. 4 is a flowchart of transmission processing for send information executed by the transmission module.

As described above, according to the transmission processing illustrated in FIG. 4, if a sending failure occurs during sending of send information from the own transmission module 2A, processing in S103 to S106 is repeated. At this time, while the information stored in the information storage unit 25 is retained, an attempt to eliminate the sending failure is made by repeating resending of the send information while autonomously changing a part of the sending parameters stored in the sending parameter storage unit 22. Then, if the send information is successfully resent by changing the sending parameters, the transmission processing is ended.

Resend Result Information Sending Processing

Figure 8:
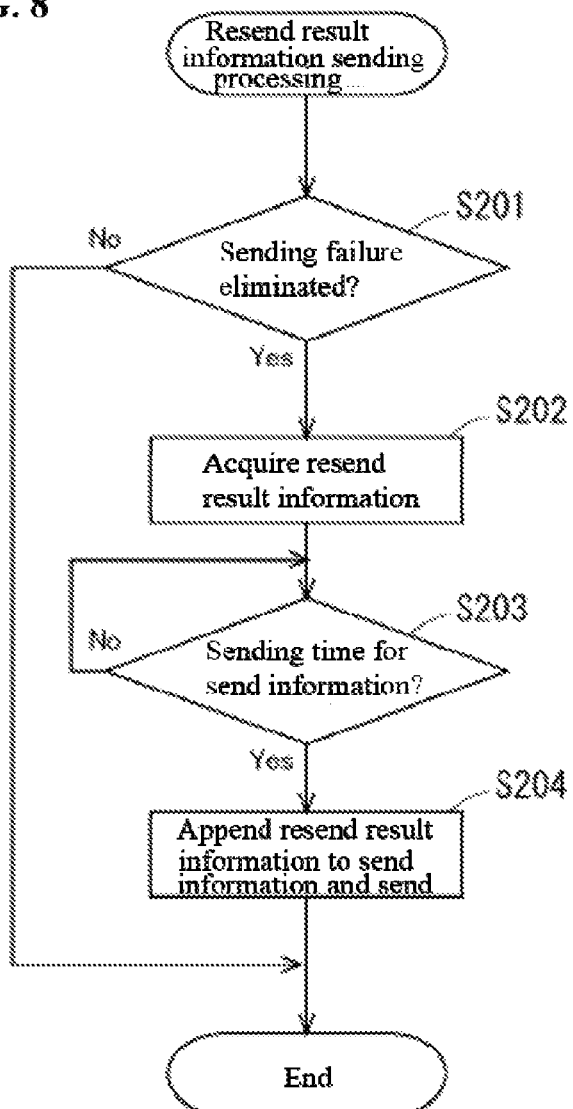
FIG. 8 is a flowchart of resend result information sending processing executed by a transmission module.

Here, resend result information sending processing for sending resend result information related to a sending failure that has occurred in the transmission module 2A during the above-described transmission processing toward the information processing apparatus 1 will be described based on FIG. 8. The resend result information sending processing may be realized by the transmission module 2A shown in FIG. 1 executing a predetermined control program at predetermined intervals, and specific details of this processing will be described below. However, substantially the same resend result information sending processing is applicable to other transmission modules as well.

First, in S201, it is judged whether or not a sending failure has occurred in the transmission module 2A, and whether the sending failure has been eliminated. For example, if the result of judgment in S103 is affirmative at least once, and afterwards the result of judgment in S103 is negative in the above-described transmission processing, the result of judgment in S201 is affirmative. If the result of judgment in S201 is affirmative, the processing proceeds to S202, whereas if the result of judgment is negative, the current resend result information sending processing is ended.

Next, in S202, the acquisition unit 205 acquires resend result information. Here, the resend result information is information for notifying the information processing apparatus 1 of how a sending parameter (any one or a plurality of the diversity parameter, the sending power parameter, the node parameter, the network parameter, and the channel parameter) has been changed in S105 described above between the occurrence of the sending failure and the elimination of the sending failure, as well as how the result of resending of the send information using the changed sending parameter has changed. Note that a specific configuration of the resend result information will be described later. If the processing in S202 is complete, the processing proceeds to S203.

In S203, similar to S101, the sending control unit 201 judges whether or not it is the sending time that the own transmission module 2A should send the send information to the transmission module 2B, which is located downstream of the own transmission module 2A. The processing in S203 is performed to judge the sending time of send information to be newly sent in order to send the resend result information acquired in S202 along with the new send information. Then, if the result of judgment in S203 is affirmative, the processing proceeds to S204, whereas if the result of judgment is negative, the processing in S203 is performed again.

Figure 9:
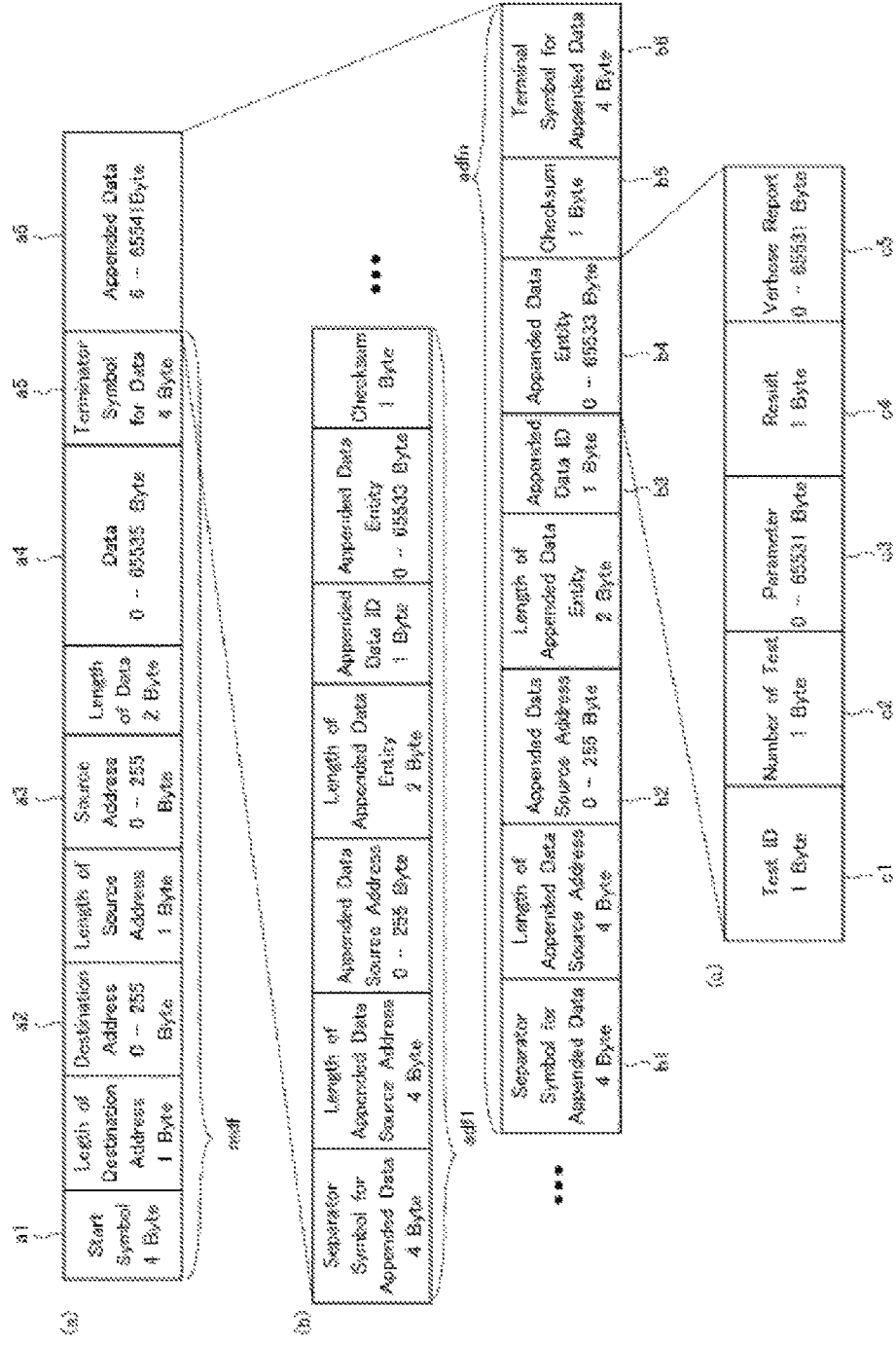
FIG. 9 schematically shows a data structure of send information containing resend result information, the send information being sent from the transmission module in the resend result information sending processing illustrated in FIG. 8.

Then, in S204, the resend result information acquired in S202 is appended to the new send information, and the new send information and the resend result information are sent together from the own transmission module 2A to the transmission module 2B toward the information processing apparatus 1 by the sending control unit 201. Here, FIG. 9 shows a data structure of the new send information to which the resend result information is appended. The upper part (a) of FIG. 9 schematically shows the overall data structure of the new send information, and the new send information is roughly divided into nine data areas. In the present embodiment, eight areas including data areas a1 to a6, of the nine data areas form main information mdf. This main information mdf is the send information itself without the resend result information shown in FIG. 5 appended thereto, and therefore its detailed description is omitted. The data area a6 stores resend result information adf that is appended to the main information mdf.

Here, the middle part (b) of FIG. 9 shows a detailed data structure of the area a6 in which the resend result information adf is stored. Note that in FIG. 9(b), the structure of pieces of resend result information that are appended in a plurality of transmission modules is shown, and each of the appended pieces of resend result information is denoted by the reference numeral adf. Note that since the transmission module 2A is located the most upstream on the transmission path as shown in FIG. 1, send information that is sent from the transmission module 2A is not relayed by the other transmission modules. Therefore, only a single piece of resend result information adf1 is stored in the area a6. Here, data areas b1 to b6 that form a piece of resend result information adf will be described. The area b1 (Separator Symbol for Appended Data) is a specific byte string indicating the start of a single piece of resend result information adf that is appended. The area b2 (Appended Data Source Address) indicates the address of a transmission module (transmission module 2A in the case of the present embodiment) to which the single piece of resend result information adf is appended. The area b3 (Appended Data ID) is an identifier that identifies entity data of the resend result information in the area b4, which is described below.

Here, the area b4 (Appended Data Entity) indicates the entity data of the resend result information that is appended. In the present embodiment, as shown in the lower part (c) of FIG. 9, the entity data of the resend result information in the area b4 has areas c1 to c5. Specifically, an identifier (Test ID) that identifies a sending parameter that has been changed in the transmission processing is stored in the area c1. In the area c2, number-of-changes information (Number of Test) is stored, the number-of-changes information including information that indicates how many times the sending parameter specified in the area c1 was changed and is associated with resend result information adf. In the area c3, change execution information (Parameter) is stored, the change execution information indicating how the sending parameter specified in the area c1 has been changed. In the area c4, information (Result) indicating the result of sending when the sending parameter specified in the area c1 has been changed in the manner specified in the area c3, is stored. In the area c5, information (Verbose Report) indicating details of the send result specified in the area c4 is stored.

Furthermore, in the single piece of resend result information adf, the area b5 stores checksum data for detecting an error in that single piece of resend result information adf. Moreover, the area b6 indicates a specific byte string indicating the end of that single piece of resend result information adf.

Note that with respect to the entity data of the resend result information stored in the area b4, depending on details of the change that has been made to the sending parameter between the occurrence of the sending failure and the elimination of the sending failure, the details of the change may be unable to be indicated by a set of data in the areas c1 to c5. For example, when a plurality of sending parameters have been changed, or when a plurality of send results have been obtained by changing the sending parameters, the details of how the sending failure was eliminated cannot be expressed by only a single set of areas c1 to c5. In that case, the details may be expressed using a plurality of sets of areas c1 to c5, and stored in the area b4.

Figure 10:
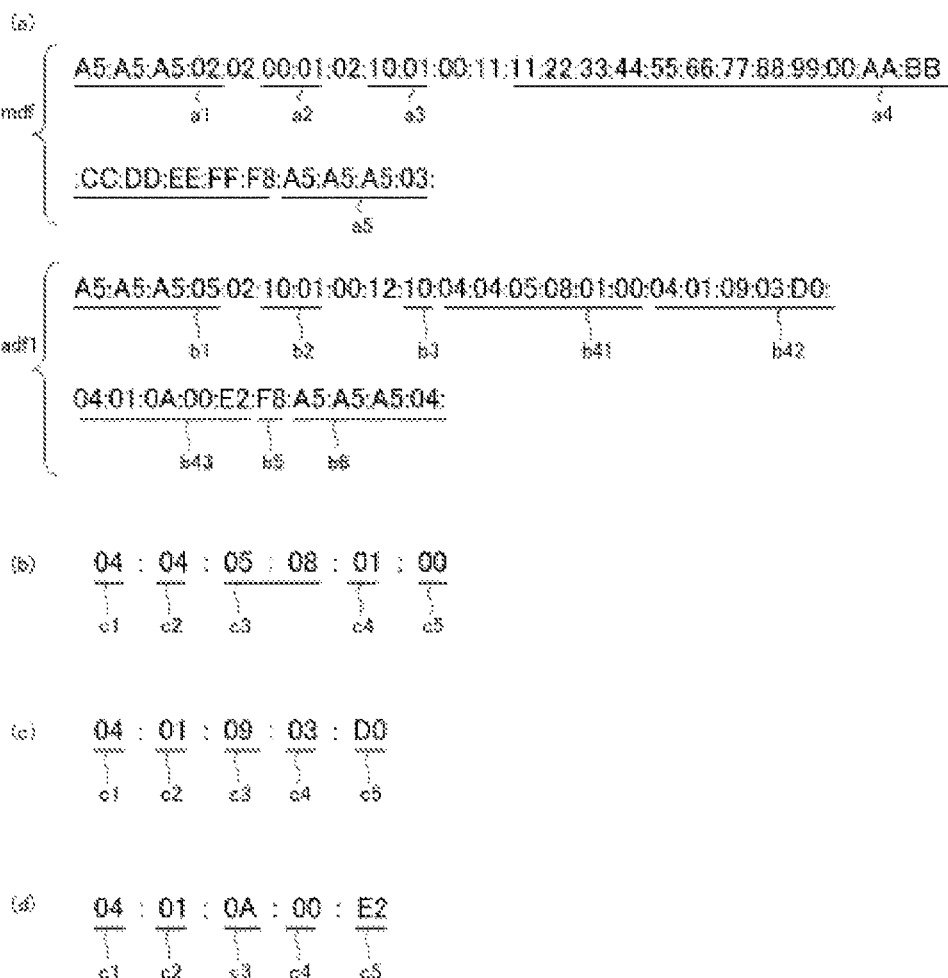
FIG. 10 is a first diagram showing specific details of data of the send information shown in FIG. 9 and containing the resend result information.

Here, FIG. 10 shows a specific configuration of the new send information which is generated in S204 and to which the resend result information is appended. Data areas in FIG. 10 correspond to the data areas shown in FIG. 9. Note that in the example shown in FIG. 10, only the sending power parameter constitutes the sending parameter to be changed. In the send information to which the resend result information shown in FIG. 10(a) is appended, measured information (temperature data) measured by the sensor provided in the transmission module 2A is stored in the area a4 of the main information mdf, and the resend result information adf1 of the transmission module 2A is appended to that main information mdf.

Note that, as described above, the transmission module 2A is located the most upstream on the transmission path and therefore receives no send information from other transmission modules. However, for example, the transmission module 2B or the like receives send information from the transmission module 2A, which is located upstream thereof, and thus, if resend result information is appended to the received send information, send information which is formed in the transmission module 2B and to which resend result information is appended is in a state in which the resend result information adf1 corresponding to the transmission module 2A and the resend result information adf2 corresponding to the transmission module 2B are sequentially concatenated to the main information mdf of that send information as shown in FIG. 9. Note that if no resend result information to be appended is present in the transmission module 2B, send information which is formed in the transmission module 2B and to which resend result information is appended is in a state in which only the resend result information adf1 corresponding to the transmission module 2A is appended to the main information mdf of that send information.

Here, returning to FIG. 10, the entity data of the resend result information stored in the area b4 of the resend result information adf1 is formed of three pieces of data b41, b42, and b43, and the details of those pieces of data are described in FIGS. 10(b), 10(c), and 10(d), respectively. First, the data b41 will be described based on FIG. 10(b). As described above, the sending parameter that has been changed is the sending power parameter, and therefore a corresponding Test ID, that is, 04 is stored in the area c1. Note that in the present invention, the values of Test ID are correlated with the types of the sending parameters as follows:

00: network parameter
01: node parameter
02: channel parameter
03: diversity parameter
04: sending power parameter Next, in the area c2, 04, which corresponds to number-of-changes information (four times) regarding the number of times the sending power parameter contained in the data 41 has been changed is stored. Then, the values of the sending power parameter corresponding to the four instances of change are stored in the area c3 in the form of a range of the change. In the present embodiment, 05:08, which is information indicating that the sending power has been increased by increments of one from 05 to 08, is stored in the area c3.

Moreover, in the area c4, the result of sending when the send information was resent by increasing the sending power in this manner is stored. The result of sending stored in the area c4 is defined as follows:

00: successfully sent
01: sending failure (a state in which an acknowledge signal has not been received yet)
02: sending failure (a state in which any error occurred even though an acknowledge signal was received)
03: sending failure (a state in which predetermined conditions defined as a favorable sending environment are not formed even though an acknowledge signal was received)

Note that in the data b41 shown in FIG. 10(b), 01, which means a sending failure in which even though send information was resent by increasing the sending power, no acknowledge signal has been received from the transmission module 2B, is stored in the area c4.

Moreover, in the area c5, details of the result of resending stored in the above-described area c4 are stored, and therefore information associated with the value in the area c4 is stored. The details of the information are as follows:

When send result is 00: received signal strength (RSSI) of downstream transmission module
When send result is 01: predetermined value 00
When send result is 02: error code corresponding to error that is currently occurring
When send result is 03: received signal strength (RSSI) of downstream transmission module Note that the received signal strength (RSSI) of a downstream transmission module and the error code are contained in an acknowledge signal from the downstream transmission module. Moreover, inn the data b41 shown in FIG. 10(b), the predetermined value 00 corresponding to the sending failure 01 is stored in the area c5.

The data b41 that is configured as described above indicates that when a sending failure occurred, and hence send information was resent by changing the sending power parameter from 05 to 08 by increments of one, the result of resending was also a sending failure in which an acknowledge signal has not been received from the downstream transmission module 2B. It is also possible to create four pieces of information respectively corresponding to the four instances of change of the sending power parameter; however, the send results for the respective instances of change are the same. Therefore, the volume of the resend result information can be compressed by integrating the pieces of information regarding the four instances of change into a single piece of information as illustrated in FIG. 10(b). Accordingly, the information shown in FIG. 10(b) corresponds to summarized information according to the invention of the present application.

Similarly, the data b42 be described based on FIG. 10(c). The data b42 indicates that the send result when the sending power parameter was changed to 09 was a sending failure indicated by 03. More particularly, when the sending power parameter was changed to 09, even though an acknowledge signal from the downstream transmission module 2B was received, the RSSI was at a level represented by D0, which means that the level is still lower than a reference level for successful sending. Next, the data b43 will be described based on FIG. 10(d). The data b43 indicates that the result of sending when the sending power parameter was further increased and thus changed to 0A was successful sending. Also, the RSSI in the downstream transmission module 2B at that time was E2, which exceeds the reference level for successful sending.

The send information to which the resend result information adf1 that is configured as shown in FIG. 10 is appended is delivered to the information processing apparatus 1 by the processing in S204 described above. Then, in the information processing apparatus 1, the data recording unit 12 records the resend result information adf1, and based on that information, the information processing unit 13 can grasp the status of a sending failure that occurred between the transmission modules 2A and 2B and how the transmission modules handled and eliminated the sending failure. Moreover, the information processing apparatus 1 may also adjust the sending conditions of the transmission modules 2 and 3 using the resend result information adf1. For example, if the sending power parameter of the transmission module 2A is significantly increased from 05 to 0A, and this state continues, there is concern of an increase in power consumption. For this reason, at a point in time after a predetermined period of time has elapsed after the information processing apparatus 1 grasped the circumstances, the information processing apparatus 1 may give an instruction for the transmission module 2A to reduce the sending power parameter so as to reduce the power consumption.

Figure 11:
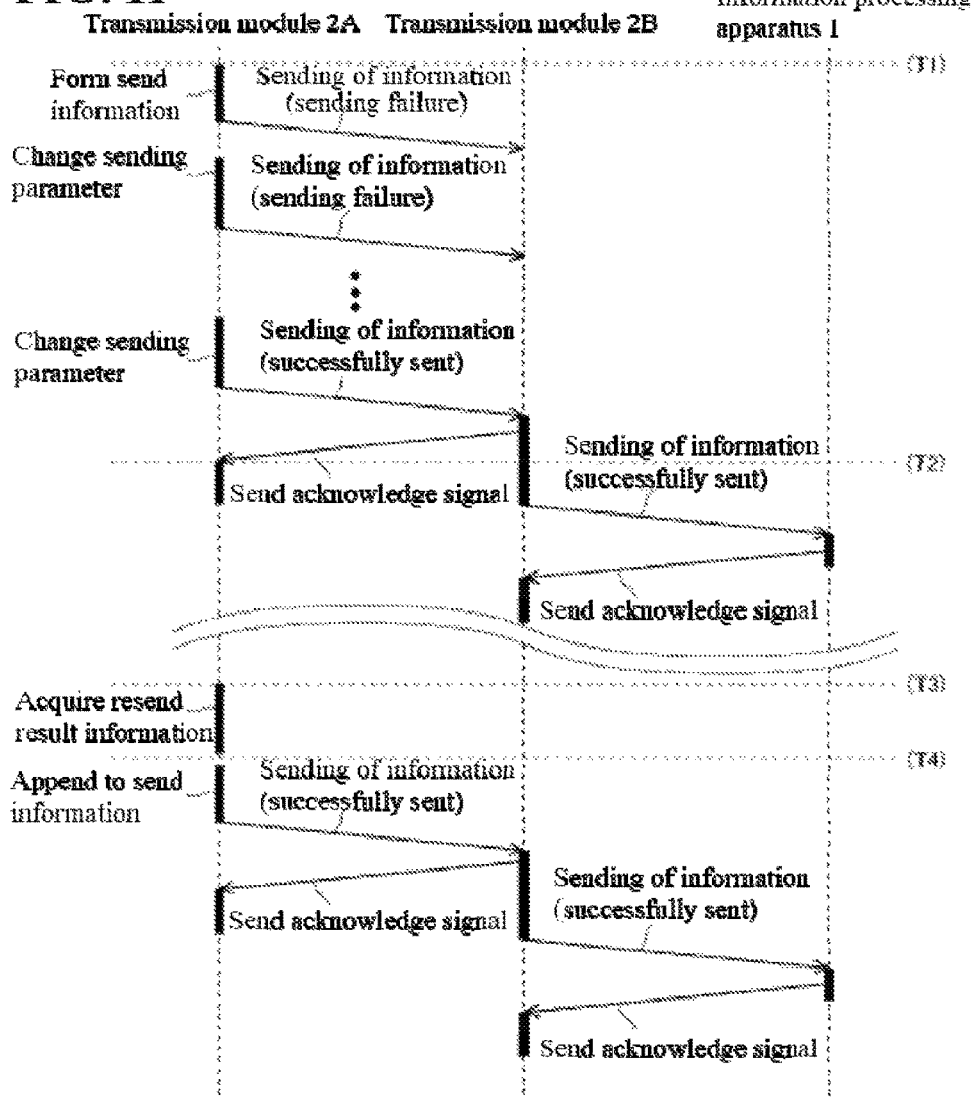
FIG. 11 is a sequence diagram regarding information exchange between transmission modules included in the network shown in FIG. 1.

Here, FIG. 11 illustrates a sequence representing exchange of signals in the case where the above-described transmission processing and resend result sending processing are performed in the transmission modules 2A and 2B and the information processing apparatus 1 included in the network 10. In an example illustrated in FIG. 11, in the transmission module 2A, the transmission processing is started at a timing T1, and a sending failure occurs. After that, the sending parameter (sending power parameter in the case of the present embodiment) is changed (increased) six times, and information sending is resent. Then, after the last instance of change of the sending power parameter and resending of the send information, an acknowledge signal is delivered from the transmission module 2B to the transmission module 2A at a timing T2 in a state in which the RSSI in the transmission module 2B satisfies the reference level. At this point in time, the transmission module 2A confirms that sending of information from the transmission module was successful. Note that afterwards, the transmission module 2B further sends the send information received from the transmission module 2A to the information processing apparatus 1 successfully.

At this point in time, although the information processing apparatus 1 has received the send information that was resent as described above, the information processing apparatus 1 does not grasp the sending failure that occurred in sending at the timing T1 and the details of how the transmission module 2A eliminated the sending failure by performing the processing of successively increasing the sending power parameter from 05 to 0A. That is to say, the information processing apparatus does not know the processing that the transmission module 2A autonomously performed to eliminate the communication failure. Thus, the resend result sending processing is started at a timing T3, and the details of the processing that transmission module 2A performed to eliminate the above-described sending failure are acquired in the form of resend result information, and then, at a timing T4, this resend result information is appended to new send information to be sent from the transmission module 2A to the transmission module 2B, so that the new send information shown in FIG. 10 is formed. After that, this new send information is delivered to the information processing apparatus 1 via the transmission module 2B, and consequently, the information processing apparatus obtains information regarding the sending failure.

Modification Example 1

Although the transmission processing related to sending of information between the transmission modules 2A and 2B have been described in the above-described embodiment, the above-described transmission processing is also applicable between the transmission module 2B and the sending/receiving apparatus 1a of the information processing apparatus 1, which perform wireless communication with each other. However, in this case, in the transmission processing in the transmission module 2B, the occurrence of a sending failure is confirmed based on a reception notification that is sent from the reception notification unit 14 of the server 1b connected to the sending/receiving apparatus 1a, the processing of increasing the sending power parameter is performed in the transmission module 2B in accordance with the confirmation result, and the details of the processing are delivered to the information processing apparatus 1 by the transmission module 2B performing the resend result sending processing.

Modification Example 2

Moreover, in the above-described embodiment, resend result information sent from the transmission module 2A is delivered to the information processing apparatus 1 in a state in which it is appended to send information that is newly sent after the acquisition of the resend result information. However, only the resend result information may be delivered to the information processing apparatus 1 alone. For example, in the case where the sending period for send information from the transmission module 2A is set to a relatively long period, if the resend result information is delivered only at the timing when the new send information is sent, delivery of the resend result information to the information processing apparatus 1 may be delayed, and this delay may inhibit quick collection of the resend result information. In such cases, it is preferable to send only the resend result information alone as described above. Moreover, a plurality of pieces of resend result information corresponding to a plurality of sending failures occurring in the transmission module 2A may also be collectively sent to the information processing apparatus 1.

Modification Example 3

Moreover, in the case where the transmission module 2B is a transmission module of a type equipped with a sensor, send information that is sent from the transmission module 2B to the information processing apparatus 1 also has the data structure shown in FIG. 5. However, the measured temperature data contained in the area a4 may be data that is obtained by adding the temperature data measured by the transmission module 2B to measured temperature data contained in send information received from the transmission module 2A. In this case, the measured temperature data contained in the send information received from the transmission module 2A is stored in the information storage unit 25 together with the temperature data measured by the transmission module 2B, and in the processing in S102 illustrated in FIG. 4, send information to be sent from the transmission module 2B is formed such that the measured temperature data contained in the send information received from the transmission module 2A is contained in this send information.

Modification Example 4

Moreover, according to the above-described embodiment, a transmission module performing the transmission processing and the resend result information sending processing sends resend result information to the information processing apparatus 1; however, instead of this configuration, the transmission module may also be configured to send the resend result information to a predetermined processing apparatus. In this case, using the resend result information, the predetermined processing apparatus grasps what kind of processing for eliminating the sending failure was performed in the network 10. Then, the predetermined processing apparatus preferably provides the grasped details to the information processing apparatus 1, and thus the information processing apparatus 1 can effectively manage the transmission modules that belong to the network 10.

Embodiment 2

In a second embodiment, attention is focused on the node parameter, instead of the above-described sending power parameter, which serves as the sending parameter to be changed in the transmission processing. With respect to changing of the node parameter in the transmission processing, it is assumed that, as described above based on FIGS. 6A and 6B, a sending failure has occurred between the transmission modules 2A and 2B, and as a result, the final connection destination of the transmission module 2A has been changed to the transmission module 3A. Moreover, the node addresses of the transmission modules 3A, 3B, and 3C are 40:01, 50:01, and 60:01, respectively.

Here, FIG. 12 shows a specific configuration of new send information to which resend result information generated by the resend result information sending processing is appended in the case where the node parameter has been changed as a result of the transmission processing. Data areas in FIG. 12 correspond to the data areas shown in FIG. 9. In send information which is shown in FIG. 12(a) and to which resend result information is appended, resend result information adf1 in the case where the node parameter has been changed is appended to the main information mdf.

In the case of the present embodiment, the entity data of the resend result information stored in the area b4 of the resend result information adf1 is formed of two pieces of data b44 and b45, and details of the two pieces of data are described in FIGS. 12(b) and 12(c), respectively. First, the data b44 be described based on FIG. 12(b). As described above, the parameter that has been changed is the node parameter, and therefore a corresponding Test ID, that is, 01 is stored in the area c1. Next, in the area c2, 02, which corresponds to number-of-changes information (two times) regarding the number of times the node parameter has been changed, the information contained in the data b44, is stored. Then, a value of the node parameter corresponding to the two instances of change, that is, the node address is stored in the area c3. In the present embodiment, as information indicating that the node parameter has been changed so that the transmission module 3B whose node address is 50:01 and the transmission module 3C whose node address is 60:01 serve as new connection destinations of the transmission module 2A, the node addresses of the respective transmission modules are stored in the area c3.

Moreover, in the area c4, the result of sending when the send information was resent by changing the node parameter is stored. Note that in the data b44 shown in FIG. 120, 02, which means that although the send information was resent to the changed connection destinations, that is, the transmission modules 3B, 3C, and an acknowledge signal containing an error code was received from each of the transmission modules, is stored in the area c4. Moreover, details of the send result stored in the above-described area c4 are stored in the area c5. In the data b44 shown in FIG. 12(b) the error code 01 sent from the transmission modules 3B, 3C is stored.

The data b44 that is configured as described above indicates, in a summarized manner, that when, due to the occurrence of a sending failure, the connection destination of the transmission module 2A was changed to the transmission modules 3B, 3C, and the send information was resent, the resend result was a sending failure with the acknowledge signals containing the same error code being received. Accordingly, the information shown in FIG. 12(b) corresponds to summarized information according to the invention of the present application.

Similarly, the data b45 will be described based on FIG. 12(c). The data b45 indicates that the result of sending when the node parameter was further changed to change the connection destination to the transmission module 3A was successful sending. Moreover, as shown in the area c5, the RSSI in the downstream transmission module 2B at that time was E2, which exceeds the reference level for successful sending.

The send information which is configured as shown inn FIG. 12 and to which the resend result information adf1 is appended is delivered to the information processing apparatus 1 by the processing in S204 described above. Then, in the information processing apparatus 1, the data recording unit 12 records the resend result information adf1, and based on that information, the information processing unit 13 can grasp the status of the sending failure that occurred between the transmission modules 2A and 2B and how the transmission modules handled and eliminated the sending failure. Moreover, the information processing apparatus 1 may also adjust the sending conditions of the transmission modules 2 and 3 using the resend result information adf1. For example, changing of the connection destination of the transmission module 2A to the transmission module 3A results in an increase in the number of transmission modules interposed between the transmission module 2A and the information processing apparatus 1, and thus there is concern that traffic on the network 10 may increase. To address this issue, at the time after a predetermined period of time has elapsed after the status was grasped, the information processing apparatus 1 may give an instruction for the transmission module 2A to change the connection destination back to the transmission module 2B, which is the original connection destination.

OTHER EMBODIMENTS

In the foregoing embodiments, specific examples of resend result information in the cases where the sending power parameter or the node parameter is changed have been described. However, in the cases where other sending parameters are changed as well, resend result information is acquired by the acquisition unit 205 in the same manner and appended to send information. For example, in the case where the changed sending parameter is the network parameter, the value of Test ID in the area c1 is 00, and the identifier of a searched network is stored in the area c3. Alternatively, in the case where the changed sending parameter is the channel parameter, the value of Test ID in the area c1 is 02, and the set value for a channel is stored in the area c3. In the case where the changed sending parameter is the diversity parameter, the value of Test ID in the area c1 is 03, and 00, which indicates disabling of the diversity function, or 01, which indicates enabling of the diversity function, is stored in the area c3.

Moreover, in the case where a plurality of types of sending parameters are changed, resend result information can be formed by concatenating pieces of data corresponding to the change of the respective types of sending parameters and each having the areas c1 to c5. For example, in the case where the above-described sending power parameter is changed, and furthermore the above-described node parameter is changed after the change of the sending power parameter, entity data stored in the area b4 can be formed by concatenating the pieces of data b44 to b45 shown in FIG. 12 to the pieces of data b41 to b43 shown in FIG. 10.

INDEX TO THE REFERENCE NUMERALS 1, 4, 5 . . . , information processing apparatus
1b, 4b, 5b . . . server 2, 2A, 2B, 3, 3A, 3B transmission module
N2, N3, 10 . . . network

The invention claimed is:

1. A transmission module that transmits predetermined send information to be processed by an information processing apparatus along a predetermined transmission path on which the information processing apparatus is present, the transmission module comprising a processor configured with a program to perform operations comprising:
   operation as a communication unit that sends the predetermined send information from the transmission module to a downstream transmission module on the predetermined transmission path in accordance with predetermined sending parameters that are set for sending of the predetermined send information from the transmission module to the downstream transmission module, the downstream transmission module being located downstream of the transmission module on the predetermined transmission path;
   operation as a sending completion confirming unit that confirms a sending completion state in which the predetermined send information has been received by the downstream transmission module or has reached the information processing apparatus;
   operation as a sending parameter changing unit that changes, if a sending failure in which the sending completion state of the predetermined send information is not confirmed by the sending completion confirming unit occurs, a part or all of the predetermined sending parameters used for sending of the predetermined send information with respect to which the sending failure has occurred;
   operation as the communication unit that resends the predetermined send information in accordance with the predetermined sending parameters after the predetermined sending parameters are changed by the sending parameter changing unit; and
   operation as an acquisition unit that acquires the part or all of the predetermined sending parameters changed by the sending parameter changing unit between the occurrence of the sending failure and confirmation of the sending completion state of the predetermined send information resent by the communication unit, and acquires resend result information related to a send result corresponding to the changed part or all of the predetermined sending parameters, wherein
   the resend result information acquired by the acquisition unit is sent toward a predetermined processing apparatus, and
   the predetermined sending parameters comprise a diversity parameter, a sending power parameter, a node parameter, a network parameter, and a channel parameter.

2. The transmission module according to claim 1, wherein if the sending failure occurs again after the predetermined send information has been resent, the communication unit repeats resending the predetermined send information involving a further change of the predetermined sending parameters and the sending completion confirming unit repeats confirming the sending completion state, and
the acquisition unit acquires a plurality of the changed predetermined sending parameters corresponding to repeated changes performed by the sending parameter changing unit, and the acquires resend result information related to a send result corresponding to each of the plurality of the changed predetermined sending parameters.

3. The transmission module according to claim 1, wherein information regarding at least two of the predetermined sending parameters and send results corresponding to the at least two sending parameters, of the resend result information, is formed as summarized information with a compressed information volume.

4. The transmission module according to claim 1, wherein the predetermined processing apparatus is the information processing apparatus.

5. The transmission module according to claim 4, wherein the resend result information is appended to new predetermined send information that is newly sent by the communication unit after the sending completion state of the predetermined send information resent by the communication unit has been confirmed, and sent toward the information processing apparatus together with the new predetermined send information.

6. The transmission module according to claim 1, wherein the processor is further configured with the program to perform operations comprising:
   operation as the communication unit that receives upstream resend result information from an upstream transmission module that is located upstream of the transmission module on the predetermined transmission path, the upstream resend result information corresponding to resend result information generated in the upstream transmission module,
   wherein the resend result information acquired by the acquisition unit is sent toward the predetermined processing apparatus together with the upstream resend result information received by the communication unit.

7. The transmission module according to claim 1, further comprising:
   a memory that stores the predetermined send information,
   wherein when the sending failure occurs, operation as the sending parameter changing unit changes a part or all of the predetermined sending parameters with respect to which the sending failure has occurred and resends the predetermined send information while retaining the information in the memory.

8. The transmission module according to claim 1, further comprising:
   a sensor that detects an environment parameter around the transmission module or within the transmission module,
   wherein the communication unit sends the detected environment parameter as the predetermined send information.

9. A network system configured to transmit predetermined send information to be processed by an information processing apparatus along a predetermined transmission path on which the information processing apparatus is present via a plurality of transmission modules, wherein
   at least one transmission module of the plurality of transmission modules comprises a processor configured with a program to perform operations comprising:
      operation as a communication unit that sends the predetermined send information from the transmission module to a downstream transmission module on the predetermined transmission path in accordance with predetermined sending parameters that are set for sending of the predetermined send information from the transmission module to the downstream transmission module, the downstream transmission module being located downstream of the transmission module on the predetermined transmission path;

operation as a sending completion confirming unit that confirms a sending completion state in which the predetermined send information has been received by the downstream transmission module or has reached the information processing apparatus;

operation as a sending parameter changing unit that changes, if a sending failure in which the sending completion state of the predetermined send information is not confirmed by the sending completion confirming unit occurs, a part or all of the predetermined sending parameters used for sending of the predetermined send information with respect to which the sending failure has occurred;

operation as the communication unit that resends the predetermined send information in accordance with the predetermined sending parameters after the predetermined sending parameters are changed by the sending parameter changing unit changing; and operation as an acquisition unit that acquires the part of all of the predetermined sending parameters changed by the sending parameter changing unit between the occurrence of the sending failure and confirmation of the sending completion state of the predetermined send information resent by the communication unit, and acquires resend result information related to a send result corresponding to the changed part or all of the predetermined sending parameters, wherein the at least one transmission module sends the resend result information acquired by the acquisition unit toward a predetermined processing apparatus, and the predetermined sending parameters comprise a diversity parameter, a sending power parameter, a node parameter, a network parameter, and a channel parameter.

10. An information transmission method for transmitting predetermined send information to be processed by an information processing apparatus along a predetermined transmission path on which the information processing apparatus is present via a transmission module that transmits the predetermined send information, the method comprising:

sending the predetermined send information from the transmission module to a downstream transmission module on the predetermined transmission path in accordance with predetermined sending parameters that are set for sending of the predetermined send information from the transmission module to the downstream transmission module, the downstream transmission module being located downstream of the transmission module on the predetermined transmission path;

confirming a sending completion state in which the predetermined send information has been received by the downstream transmission module or has reached the information processing apparatus;

changing, if a sending failure in which the sending completion state of the predetermined send information is not confirmed in the confirming the sending completion state occurs, a part or all of the predetermined sending parameters used for sending of the predetermined send information with respect to which the sending failure has occurred, and resending the predetermined send information in accordance with the predetermined sending parameters after the changing of the part or all of the predetermined sending parameters;

acquiring the part or all of the predetermined sending parameters changed in the changing the part of all of the predetermined sending parameters, between the occurrence of the sending failure and confirmation of the sending completion state of the predetermined send information resent in the changing the part of all of the predetermined sending parameters, and acquiring resend result information related to a send result corresponding to the changed predetermined sending parameter; and sending the resend result information acquired in the acquiring the part or all of the changed predetermined sending parameters, toward a predetermined processing apparatus, wherein the predetermined sending parameters comprise a diversity parameter, a sending power parameter, a node parameter, a network parameter, and a channel parameter.

11. A non-transitory computer-readable medium storing an information transmission program which, when executed, causes a processor of an information processing apparatus to perform operations comprising:

sending predetermined send information from a transmission module to a downstream transmission module on the predetermined transmission path in accordance with predetermined sending parameters that are set for sending of the predetermined transmission path from the transmission module to the downstream transmission module, the downstream transmission module being located downstream of the transmission module on the predetermined send information;

confirming a sending completion state in which the predetermined send information has been received by the downstream transmission module or has reached the information processing apparatus;

changing, if a sending failure in which the sending completion state of the predetermined send information is not confirmed in the confirming the sending completion state occurs, a part or all of the predetermined sending parameters used for sending of the predetermined send information with respect to which the sending failure has occurred, and resending the predetermined send information in accordance with the predetermined sending parameters after the changing of the part or all of the predetermined sending parameters;

acquiring the part or all of the predetermined sending parameters changed in the changing the part of all of the predetermined sending parameters, between the occurrence of the sending failure and confirmation of the sending completion state of the predetermined send information resent in the changing the part of all of the predetermined sending parameters, and acquiring resend result information related to a send result corresponding to the changed predetermined sending parameter; and sending the resend result information acquired in the acquiring the part or all of the changed predetermined sending parameters, to a predetermined processing apparatus, wherein the predetermined sending parameters comprise a diversity parameter, a sending power parameter, a node parameter, a network parameter, and a channel parameter.

* * * * *